United States Patent
Vandenhove

(10) Patent No.: US 8,001,718 B2
(45) Date of Patent: Aug. 23, 2011

(54) RECIPIENT FOR CONTAINING MOIST SUBSTRATE

(76) Inventor: Frans Vandenhove, Rijkel-Borgloon (BE)

( * ) Notice: Subject to any disclaimer, the term of this patent is extended or adjusted under 35 U.S.C. 154(b) by 139 days.

(21) Appl. No.: 12/297,924

(22) PCT Filed: Apr. 23, 2007

(86) PCT No.: PCT/EP2007/003529
§ 371 (c)(1),
(2), (4) Date: Oct. 21, 2008

(87) PCT Pub. No.: WO2007/121960
PCT Pub. Date: Nov. 1, 2007

(65) Prior Publication Data
US 2009/0107040 A1    Apr. 30, 2009

(30) Foreign Application Priority Data
Apr. 21, 2006  (EP) .................. PCT/EP2006/003675

(51) Int. Cl.
*A01G 1/04*         (2006.01)
(52) U.S. Cl. .......................................................... 47/1.1
(58) Field of Classification Search ...................... 47/1.1
See application file for complete search history.

(56) References Cited

U.S. PATENT DOCUMENTS

| | | | | |
|---|---|---|---|---|
| 3,468,471 A | * | 9/1969 | Linder | 206/439 |
| 4,134,535 A | * | 1/1979 | Barthels et al. | 383/102 |
| 5,230,430 A | | 7/1993 | Kidder | |
| 5,659,997 A | | 8/1997 | Sprehe et al. | |
| 5,662,576 A | | 9/1997 | Sprehe et al. | |
| 6,358,731 B1 | * | 3/2002 | Hsu | 435/297.5 |
| 7,244,223 B2 | * | 7/2007 | Hartman et al. | 493/213 |
| 7,685,793 B2 | * | 3/2010 | Newrones et al. | 53/405 |
| 2009/0107040 A1 | * | 4/2009 | Vandenhove | 47/65.7 |

FOREIGN PATENT DOCUMENTS

| | | | | |
|---|---|---|---|---|
| EP | 19929 A2 | * | 12/1980 | 47/56 |
| EP | 0 085 928 A1 | | 8/1983 | |
| EP | 0 418 323 B1 | | 8/1993 | |
| EP | 0 645 078 A1 | | 3/1995 | |
| GB | 2 025 894 A | | 1/1980 | |
| GB | 2025894 A | * | 1/1980 | |
| NL | 7904646 | | 12/1979 | |

* cited by examiner

*Primary Examiner* — Francis T Palo
(74) *Attorney, Agent, or Firm* — Bacon & Thomas, PLLC

(57) ABSTRACT

The invention relates to a recipient for containing moist substrate, which recipient comprises a flexible polymer wall having an outer surface and at least one gas exchanging membrane, which gas exchanging membrane is hermetically sealed to the outer surface of the flexible polymer wall along a sealing line. The sealing line defining a hermetically sealed area of the flexible polymer wall. The flexible polymer wall comprises at least one aperture, being provided in this hermetically sealed area of the flexible polymer wall. The recipient further comprises a means for creating an air chamber circumscribed by the hermetically sealed area and the gas exchanging membrane, for preventing moist substrate to contact the gas exchange membrane when the recipient is filled with moist substrate.

39 Claims, 9 Drawing Sheets

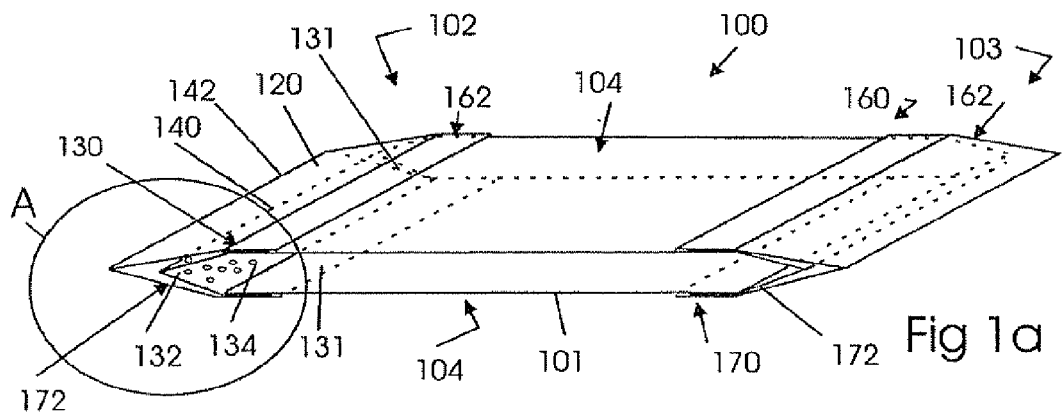
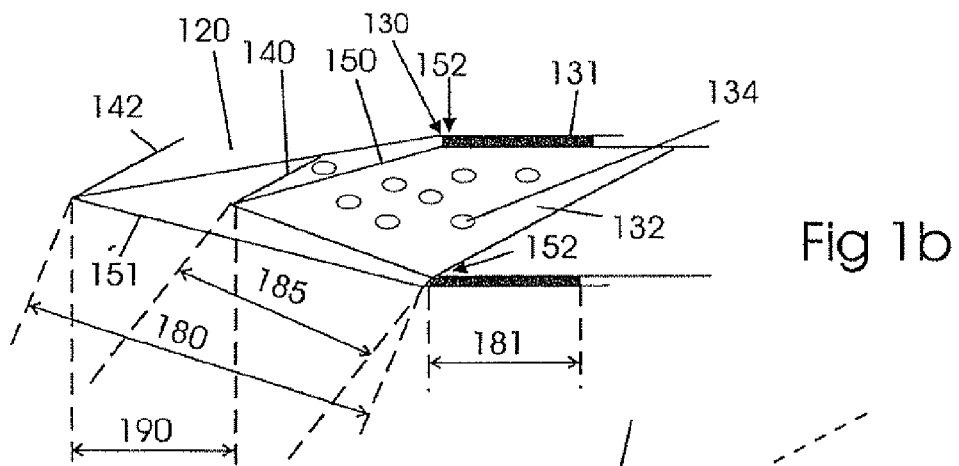
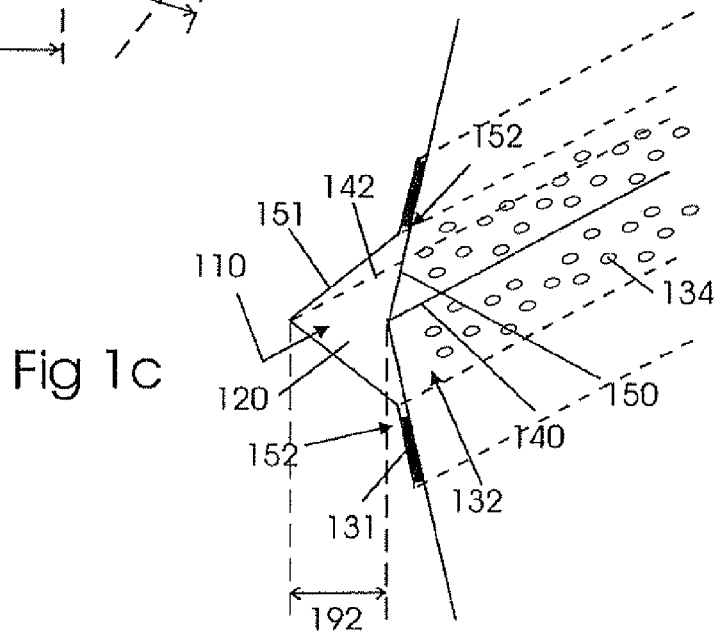

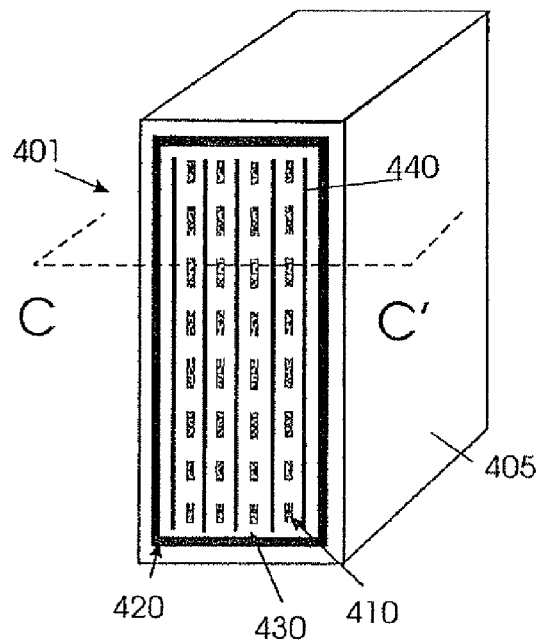
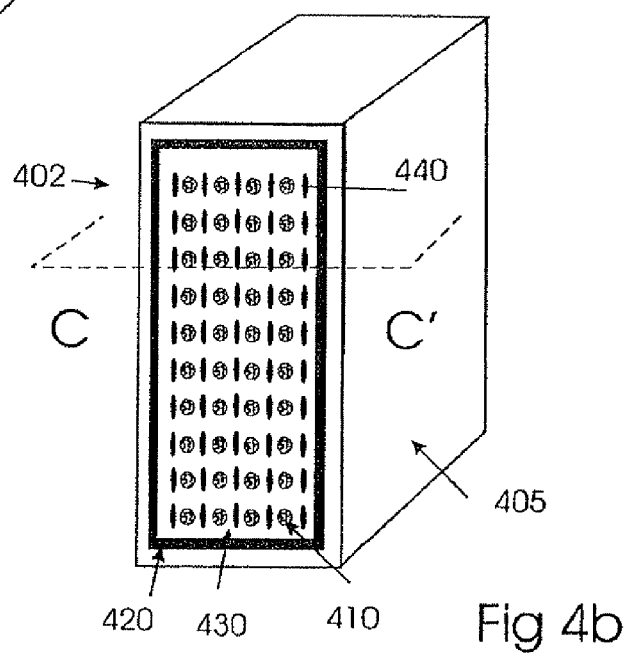
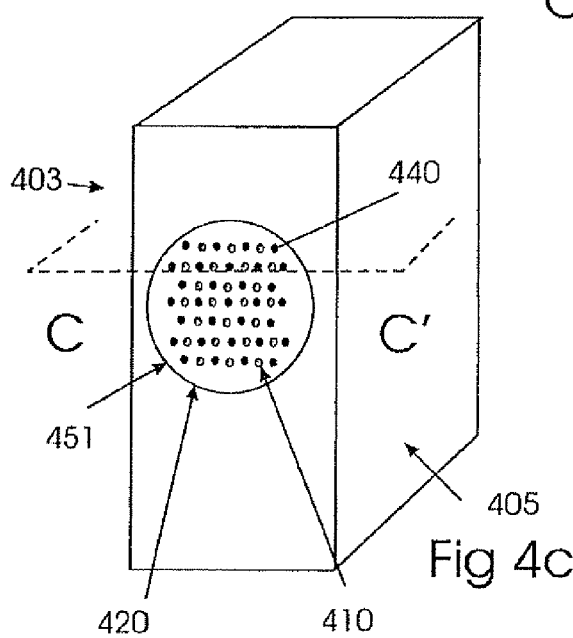

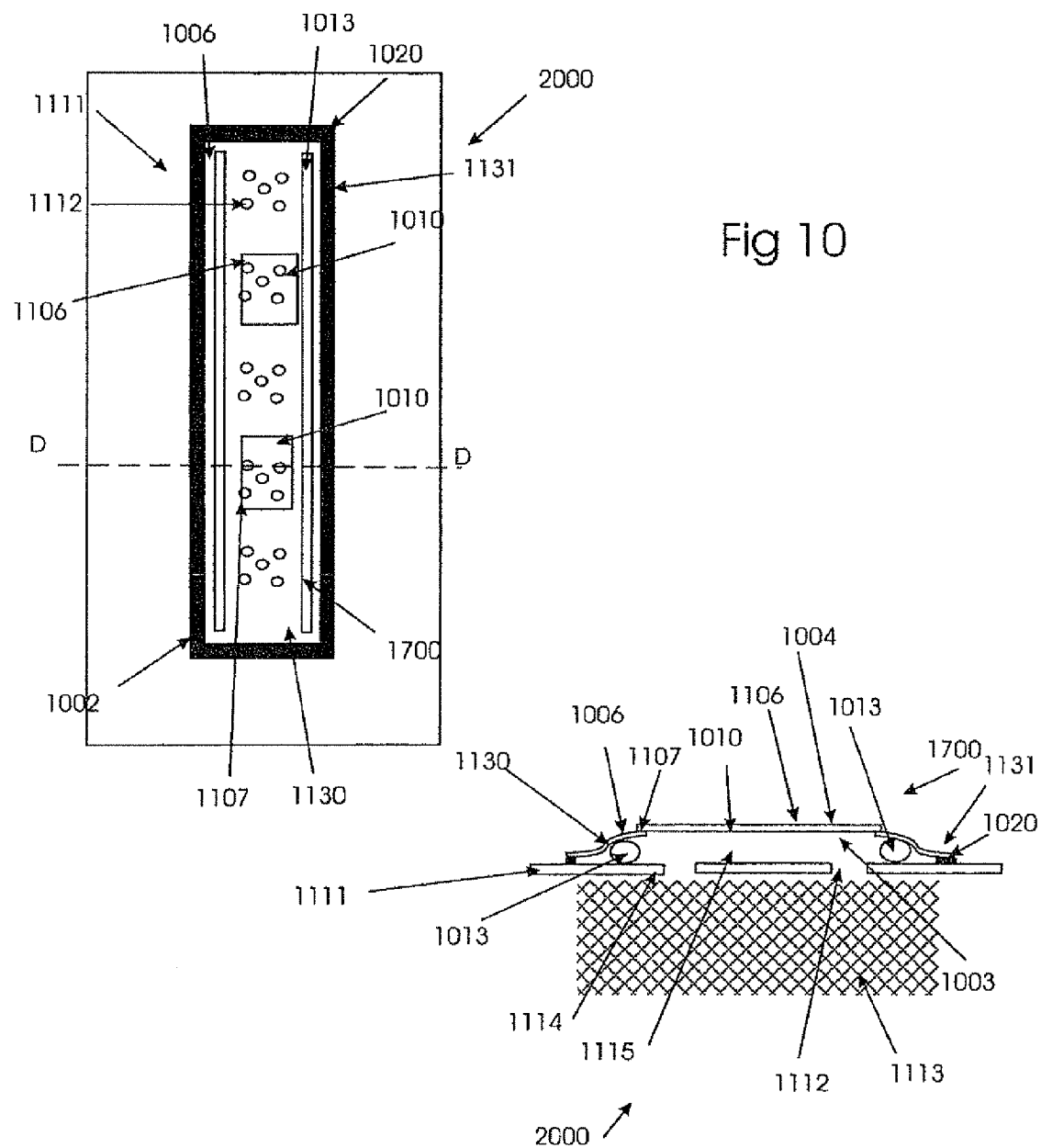

RECIPIENT FOR CONTAINING MOIST SUBSTRATE

This application is the U.S. National Stage of International Patent Application No. PCT/EP2007/003529, filed Apr. 23, 2007 which claims the benefit under 35 USC §120 and §365 of International Application No. PCT/EP2006/003675, filed Apr. 21, 2006.

TECHNICAL FIELD OF THE INVENTION

The present invention relates to a recipient for containing any substrate that requires to breathe through the walls of the recipient, such as a moist substrate, or a powder, and more particular to recipients for cultivation of mushroom spawn and/or fungi.

BACKGROUND OF THE INVENTION

In the cultivation of mushroom spawn and fungi, it is known to use containers if the form of polymer recipient in order to hold humid substrate in which the fungi or mushroom spawn is cultivated.

Oxygen is to be allowed to enter into the recipient, being a bag, in order to enable the cultivation of the spawn or fungi. As the spawn or fungi is very sensitive for microspore contamination, e.g. contamination with germs or bacteria, recipients such as bags made completely from gas permeable but liquid impermeable membranes are known from EP418323. Such material however is quite expensive in use.

Alternative recipients are bags comprising a polymer wall, which is provided with a plurality of openings. The openings are closed by means of filter membranes, usually gas and liquid permeable fibrous material. As an example, a bag is described in EP85928. This bag has the disadvantage that it should not be filled above the level of the filter membrane.

Another alternative recipient, being a bag, is described in EP645078. A polyester bag is provided with a number of openings, which openings are sealed by gas permeable sealing strips, e.g. a strip provided from spun bonded micro porous polyolefin.

It was found that recipients, such as e.g. the bags of EP645078, in spite of the sealing with a micro porous strip, still suffer from contamination with germs, fungi and/or microspores when being filled completely with moist substrate.

SUMMARY OF THE INVENTION

The present invention is based on attempts to avoid contamination with germs, fungi and/or microspores of bags comprising at least one aperture covered by a gas exchange membrane, which bags are completely filled with moist substrate as shown e.g. in EP645078. Surprisingly it has been found that the risk of contaminating the substrate within the recipient such as contaminating the moist substrate with germs, fungi and/or microspores could be reduced significantly by avoiding the gas exchange membrane contacting the substrate in the recipient. It has been found that existing bags, allowing the gas exchange membrane to contact the substrate, and allowing the membrane to be humidified by the moisture of the substrate, frequently allow germs and fungi to contaminate the substrate. Such germs and fungi will grow, even if the substrate is dried in the vicinity of the apertures later on. Preventing the gas exchange membrane to moisten, by avoiding contact between moist substrate and gas exchange membrane, prohibits to a large extent that contamination migrates through the gas exchange membrane towards the moist substrate.

In a similar way, it was found that when using other recipients, which have a flexible polymer wall which is to contact the moist substrate, the risk of contaminating the moist substrate with contamination with germs, fungi and/or microspores could be reduced significantly by avoiding the gas exchange membrane contacting the moist substrate at the height, i.e. at the location where the gas exchanging membrane is provided in the flexible polymer wall.

It is an object of the present invention to provide improved recipient, such as a bag, for containing moist substrate as well as a method of making the same.

It is an advantage of some embodiments of the present invention to reduce the risk of contaminating the moist substrate in the recipient, e.g. a bag, with germs and bacteria. It is an advantage of some of the embodiments of the present invention to provide recipients, e.g. bags which can be filled completely with moist substrate, while reducing the risk of such contamination.

It is also an advantage of the present invention that the gas exchange rate of the gas exchanging membrane is kept more stable and constant over time.

It is another advantage of some embodiments of the present invention that the recipients, e.g. bags, may be produced very easily and in a continuous process. It is as well an advantage of some embodiments of the present invention to provide a recipient, e.g. a bag, which can easily be stored and stacked when empty.

The above objective is accomplished by a recipient, e.g. a bag, according to the present invention.

According to a first aspect of the present invention, a recipient, e.g. a bag for containing moist substrate comprises
  a flexible polymer wall having an outer surface and an inner surface for contacting a substrate,
  at least one gas exchanging membrane, the gas exchanging membrane being coupled to said outer surface of said flexible polymer wall by a hermetical seal along a sealing line. The sealing line defines a hermetically sealed area of said flexible polymer wall.

The wall comprises at least one aperture being provided in or adjacent to the hermetically sealed area of the flexible polymer wall. The recipient further comprises a means for creating an air chamber circumscribed by the hermetically sealed area, the hermetical seal and the gas exchanging membrane, for preventing the substrate from contacting the gas exchange membrane when the recipient is filled with such a substrate, thereby bringing the substrate into contact with the hermetically sealed area of the flexible polymer wall at inner surface of said flexible polymer wall. The substrate can be a moist substrate.

The polymer wall is a flexible wall and is to contact the substrate at least along the hermetically sealed area when the recipient is filled with substrate. The means for creating an air chamber can be provided purely by the relative dimensions of the polymer wall and the gas exchange membrane, e.g. by creating an air volume between the two. The recipient or the gas exchange membrane may also comprise additional rigid walls or elements for e.g. providing additional support to the recipient, e.g. a bag or container, or to assist the recipient, e.g. a bag or container, to keep a given form or shape.

The air chamber on the one hand prevents a substrate such as a moist substrate from contacting the gas exchange membrane when the recipient is filled with the substrate such as the moist substrate thereby having the flexible polymer wall contacting the substrate such as the moist substrate along the hermetically sealed area of the flexible polymer wall. The air chamber avoids migration of bacteria and fungi through the gas exchange membrane especially when the gas exchanging membrane becomes moist. The air chamber can also create a chamber in which no active air circulation is provided. This prevents or reduces the risk of the substrate to dehumidify to a too large extent, meanwhile allowing a sufficient gas exchange between ambient and moist substrate.

The term "bag" is to be understood as a usually flexible container that may be closed for holding, storing, or carrying something. The bag, being a recipient, comprises at least one flexible wall. The bag may consist of a flexible wall, provided with gas exchanging membrane as according to the present invention.

The flexible polymer wall of the recipient, e.g. bag, may be provided out of polymer foil material such as a sheet of e.g. polyamide (PA), polyester (PES), polypropylene (PP) or polyethylene (PE), such as high density polyethylene (HDPE) or low density polyethylene (LDPE). The thickness of the polymer foil may depend on the volume and the size of the recipient, but is usually chosen in the range of 50 μm to 150 μm. It is understood that the polymer foil is liquid impermeable. The shape of the recipient, e.g. bag, may be chosen depending on the volume and the final use.

The gas exchanging membrane may be any appropriate filter membrane as presently known. It may be selected from e.g. polymer woven or nonwoven fabrics, polymer mechanically or thermally bonded nonwoven fabric, polymer or natural fiber filter paper, glass fiber paper, mechanically or thermally bonded glass fiber nonwoven fabric, mechanically bonded polymer or natural fiber nonwoven or any other suitable membrane. Alternatively, the gas exchanging membrane may be micro-perforated membrane, i.e. membranes such as a polymer membrane or a membrane made from any other suitable material, which membranes are provided with micro-perforations. Micro-perforations may be perforations having any suitable shape, e.g. that can be formed easily such as substantially circular micro-perforations. A micro-perforation may have an equivalent diameter of less than 0.5 mm, such as less than or equal to 0.1 mm, e.g. less than or equal to 0.05 mm. The equivalent diameter of a micro-perforation is the diameter of an imaginary circular perforation having a surface area equal to the surface area of that particular micro-perforation.

Micro-perforated membranes can be sufficient to prevent contamination of the substrate, especially when the air chamber between the polymer wall and the gas exchange membrane is formed as a barrier. The air chamber provides a stable air layer, which can prevent contaminants from passing through. Providing two sets of apertures (the micro-perforations in the membrane and the apertures in the wall) and an air layer creates a sort of labyrinth.

According to some embodiments of the present invention, the gas exchanging membrane may be coupled, e.g. hermetically sealed to the outer surface of the flexible polymer wall along the sealing line, thereby providing the hermetical seal.

According to some embodiments of the present invention, the recipient comprises a filter strip having a first surface and a second surface. The first and second surfaces of the filter strip are to be understood as being the major surfaces of the filter strip. The filter strip comprises an elongate flexible polymer material having at least one opening. The filter strip further comprises at least a first gas exchanging membrane allowing gas to pass from one of the first and second surface of the strip to the other of the first and second surface of the strip. The gas exchanging membrane is coupled to the elongate flexible polymer material along a first sealing line. The first gas exchange membrane covers the at least one opening. The first outer surface of the elongate flexible polymer material is coupled to the outer surface of the flexible polymer wall along the sealing line for providing said hermetical seal.

According to the present invention, the gas exchanging membrane or the first outer surface of the elongate flexible polymer material and the wall of the recipient, e.g. bag, are sealed to each other according to a sealing line. The sealing may be provided using any appropriate technique to provide a liquid and airtight seal. As an example, sealing may be provided by thermally binding, e.g. heat sealing or welding the flexible polymer wall and the gas exchanging membrane, or by using adhesive such as by gluing the wall and the gas exchanging membrane using appropriate glue or double-sided adhesive tape.

According to embodiments of the present invention, an air chamber may be created, providing an average distance between the gas exchanging membrane and the hermetically sealed part of the flexible polymer wall preferably of 0.1 mm or above or in the range such as 0.1 mm to 10 mm, such as 0.12 mm to 10 mm, or 0.2 mm to 10 mm, e.g. 0.2 mm to 5 mm, or from 1 mm to 10 mm. The height of the air chamber is usually dependent on the thickness of the spacing means for creating the air chamber.

According to an embodiment of the present invention, the means for creating an air chamber may comprise at least one fold in the flexible polymer wall, being folded according to a fold line. At least a part of this at least one fold is located in the hermetically sealed area. The fold is provided for unfolding when the recipient, e.g. bag, is filled with the substrate such as the moist substrate, or when the unfolded polymer flexible wall is provided to the recipient, which is either already filled or to be filled. For each section according to a plane perpendicular to the fold line, a first and a second intersection point are provided at the points where the plane and the sealing line intersect. The line of intersection of the flexible polymer wall and the plane between the intersection points has a length Lw. The line of intersection of the gas exchanging membrane and the hermetical seal between the sealing lines and the plane between these intersection points has a length Lm. In case the gas exchange membrane is sealed to the flexible polymer wall of the recipient, the gas exchanging membrane provides Lm. In case the gas exchange membrane is sealed to the flexible polymer wall of the recipient by means of an elongate flexible polymer material, the gas exchanging membrane and the elongate flexible polymer material provides Lm. According to an embodiment of the present invention, Lw may be smaller than Lm.

During filling of the recipient, e.g. bag, with a substrate such as a moist substrate, or during use of the polymer wall, the fold will unfold or will have to be unfolded. Because of the larger length of the line of intersection of the gas exchanging membrane and the hermetical seal between the sealing lines, in which the gas exchanging membrane is present, the line of intersection of the gas exchanging membrane and the hermetical seal between the sealing lines will have a too large length to exactly match the flexible polymer wall of the recipient, e.g. bag, when the recipient, e.g. bag, is completely filled. The line of intersection of the gas exchanging membrane and the hermetical seal between the sealing lines, hence the gas exchange membrane will bulge outwards, away from the recipient wall, so creating an air chamber between the gas exchange membrane and the sealed area of the wall in which at least one aperture is present.

According to some embodiments of the present invention, the gas exchanging membrane may be folded according to a membrane fold, which membrane fold may be substantially parallel to the fold located in the hermetically sealed area of the flexible polymer wall.

According to some embodiments of the present invention, the line of intersection with the hermetically sealed area may have a substantially V-shape profile. According to some embodiments of the present invention, the line of intersection of the gas exchanging membrane and the hermetical seal between the sealing lines may have a substantially V-shape profile. According to some embodiments of the present invention, the difference Lm-Lw may be in the range of 1 mm to 10 mm, such as in the range of 2 mm to 10 mm. Preferably the difference Lm-Lw is in the range of 4% to 20% of Lm, more preferred in the range of 4% to 10% of Lm.

According to other embodiments of the present invention, the sealed area may be provided with a plurality of apertures.

According to other embodiments of the present invention, the means for creating an air chamber may include a spacing means located between the gas exchanging membrane and the hermetically sealed area of the flexible polymer wall.

According to an embodiment of the present invention, the spacing means may be a net or gauze, said net or gauze being preferably made from polymer filaments. The open structure of the net or gauze will allow air or gas to pass easily from the inner side of the recipient, e.g. bag, to the outer side and vice versa, whereas it prevents the substrate such as the moist substrate to contact the gas exchange membrane. Preferably the net or gauze is made water-repellent.

According to embodiments of the present invention, the net or gauze may be a woven, braided or knitted net or gauze. The net or gauze may be provided out of polymer filaments such as filaments from e.g. polyamide, polyester, polypropylene or polyethylene. The term thickness is here to be understood as the thickness of the gauze measures according to generally recognizes standard norms in textiles. Optionally, the spacing means is a non woven. The spacing means may be a water repellent nonwoven.

The spacing means such as e.g. a net, a gauze or a non woven, may have a thickness in the range of 0.1 mm or above, e.g. 0.1 mm to 10 mm, such as 0.12 mm to 10 mm.

According to an embodiment of the present invention, the spacing means may be one or a plurality of polymer protuberances, blobs or polymer ribs located between the hermetically sealed area of the flexible polymer wall and the gas exchanging membrane.

According to embodiments of the present invention, the protuberances, blobs or ribs may be provided on the hermetically sealed area of the flexible polymer wall or on the gas exchanging membrane. The protuberances, blobs or ribs may have a thickness in the range of 0.1 mm to 5 mm, such as in the range of 0.2 mm to 5 mm, such as in the range of 1 mm to 5 mm. The thickness of the protuberances, ribs or blobs is to be understood as the average distance between two points of the protuberance, rib or blob, one point contacting the flexible polymer wall and the other point contacting the gas exchange membrane, which points defining an imaginary line being substantially perpendicular to the flexible polymer wall.

According to embodiments of the present invention, the at least one aperture is provided between the protuberances, blobs or ribs.

The blobs need not have particular shapes or dimensions, however blobs may e.g. be studs or may have a substantially hemispherical shape.

According to embodiments of the present invention, the plurality of polymer blobs may be in a regular or irregular array, e.g. matrix-like arranged in the hermetically sealed area. According to embodiments of the present invention, the at least one aperture is provided between said plurality of blobs. According to embodiments of the present invention, the sealed area may be provided with a plurality of apertures, which are arranged in an array, e.g. matrix-like arranged between the plurality of polymer blobs.

According to embodiments of the present invention, the recipient, e.g., bag, may comprise a plurality of ribs, which ribs are arranged substantially parallel.

According to an embodiment of the present invention, the spacing means may be a plurality of bulges provided in the hermetically sealed area of the flexible polymer wall, bulging outwards of the flexible polymer wall towards the gas exchanging membrane.

According to embodiments of the present invention, the plurality of bulges may be studs, having a circular rectangular, square or any other appropriate cross section. The plurality of bulges may be arranged in an array, e.g. matrix-like arranged in the hermetically sealed area.

According to embodiments of the present invention, the at least one aperture may be provided between the plurality of bulges.

According to embodiments of the present invention, the recipient, e.g. bag, may comprise a plurality of apertures in the hermetically sealed area, which plurality of apertures are arranged in an array, e.g. matrix-like arranged between the plurality of bulges.

According to embodiments of the present invention, the plurality of bulges may be line-like bulges.

The bulges may be provided by stamping or pressing a profile into the polymer wall of the recipient, e.g. bag, in the sealed area by means of a die.

According to embodiments of the present invention, the bulges may have a thickness in the range of 0.1 mm to 5 mm, such as in the range of 0.2 mm to 5 mm, such as in the range of 1 mm to 5 mm. Thickness of a bulge is to be understood as the average distance between the point of the bulge contacting the gas exchange membrane and the imaginary plane defined by the flexible polymer wall surface.

According to embodiments of the present invention, the spacing means may be provided by a raised edge around the aperture or apertures. The raised edge may be provided at the outer side of the flexible polymer wall in the hermetically sealed area.

Alternatively, the raised edge may be provided by polymer ribs on the gas exchange membrane extending near or along the outer perimeter of the gas exchange membrane.

According to embodiments of the present invention, the at least one aperture may have any suitable shape, e.g. that can be formed easily such as a substantially circular aperture. According to embodiments of the present invention, the at least one aperture may have a surface area in the range of 0.18 $mm^2$ to 2.00 $mm^2$. According to the present invention, when a plurality of apertures is provided, each of the apertures may have a surface area in the range of 0.18 $mm^2$ to 2.00 $mm^2$.

According to some embodiments of the present invention, the recipient may be a bag or a container.

According to a second aspect of the present invention, the recipient, e.g. bag, according to the present invention may be used for cultivation of mushroom spawn or fungi.

According to a third aspect of the present invention, it was found that the recipients according to the first aspect of the present invention are also useful to contain powder-like substrate, such as edible powder-like substrates, e.g. milk powder.

Usually such powders need to be able to exchange gasses with the ambient, which may also be referred to as to allow the powder to "breathe", when the powder is contained in a recipient. The recipients according to the first aspect of the present invention, allow the powder to exchange gas, while it prevents infection of the powder during storage due to the presence of the gas exchange membrane. The air chamber as such created between the perforated wall of the recipient and the filter prevents transfer of germs and fungi present in the ambient air to contaminate the powder-like substrate.

According to a fourth aspect of the present invention, a filter strip is provided, The filter strip has a circumference and a first and a second surface, and comprises a gas exchange membrane. The first and second surfaces of the filter strip are to be understood as being the major surfaces of the filter strip. The gas exchanging membrane allows gas, such as air or $CO_2$, to pass from one of the first and second surface of the strip to the other of the first and second surface of the strip. The first surface of the strip may be provided with means along the circumference of the strip, which means facilitates coupling such as sealing of the first surface of the strip with a polymer surface, such as a flexible polymer wall of a recipient, e.g. a bag. Such means may e.g. a means enabling thermal binding of the first surface of the strip with a polymer surface.

The filter strip comprises an elongate flexible polymer material comprising at least one opening and at least a first gas exchanging membrane coupled to the elongate flexible polymer material along a first sealing line. The first gas exchange membrane covers the at least one opening. According to embodiments, the elongate flexible polymer material may comprise N openings, N being more than one. The filter strip comprises N gas exchanging membranes, each allowing gas to pass from one of the first and second surface of the strip to the other of the first and second surface of the strip. The gas exchanging membranes are coupled to the elongate flexible polymer material along N sealing lines, each of the N gas exchange membranes covering one of the N openings.

The gas exchanging membrane or membranes may provide only part of the surface of the filter strip, such as less than 30% of the surface of the filter strip, such as less than 20% of the surface of the filter strip, e.g. only 10% of the surface of the filter strip or even only 5% of the surface of the filter strip.

The filter strip can be provided at the outer surface of a flexible polymer wall of a recipient, which flexible polymer wall comprises one or more apertures as set out above. By sealing, e.g. by thermal binding, of the flexible polymer material of the filter strip to the outer surface of the polymer flexible wall an air chamber is formed. To assist in this, the polymer flexible wall can have a spacing means for creating the air chamber on its outer surface. For example, the flexible polymer wall may be provided with one or a plurality of polymer blobs or polymer ribs. The ribs may optionally be present along the outer perimeter of the gas exchange membrane once the filter strip is sealed to the flexible polymer wall. The rib may be provided by a polymer tube or monofilament which is fixed to the flexible polymer wall. The air chamber between the filter strip and the flexible polymer wall may be realized by providing, e.g. pressing, bulges in the flexible polymer wall of the recipient with whom the filter strip will cooperate. The spacing means may be a plurality of bulges provided in the hermetically sealed area of the flexible polymer wall, bulging outwards of the flexible polymer wall towards the gas exchanging membrane being part of the filter strip. The plurality of bulges may be studs, having a circular rectangular, square or any other appropriate cross section. The plurality of bulges may be matrix-like arranged in the hermetically sealed area.

An at least one aperture may be provided between the plurality of bulges. The recipient, e.g. bag, may comprise a plurality of apertures in the hermetically sealed area, which plurality of apertures are arranged in an array, e.g. matrix-like arranged between the plurality of bulges. The plurality of bulges may be line-like bulges.

The air chamber is circumscribed by the gas exchange membrane of the filter strip, the hermetical seal provided by the elongate flexible polymer material, the sealed area and the sealing line provided between filter strip and flexible polymer wall. The filter strip according to this fourth aspect of the present invention may be used in the provision of a recipient according to the first aspect of the present invention.

The air chamber between the filter strip and the flexible polymer wall may be realized by providing an infill as a spacing means such as polymer woven or nonwoven fabrics, polymer mechanically or thermally bonded nonwoven fabric, polymer or natural fiber filter paper, glass fiber paper, mechanically or thermally bonded glass fiber nonwoven fabric, mechanically bonded polymer or natural fiber non woven or any other suitable fabric between the filter strip and the flexible polymer wall.

According to embodiments of the present invention, at least part of the flexible polymer material of the first surface of the filter strip is suitable for being sealed to a support, such as the polymer wall of a recipient or a polymer sheet being suitable to provide recipients. The filter strip further comprising a spacing means for avoiding contact between the at least first gas exchanging membrane and the support when the at least part of the flexible polymer material of the first surface of the filter strip is sealed to the support.

The filter strip may be used to provide a recipient according to the first aspect of the present invention. The support will in that case be the flexible polymer wall of the recipient.

Spacing means is synonym for a spacer, which is a means to fulfill the function as set out above.

According to embodiments, the first surface of the strip may be provided with one or a plurality of polymer blobs or polymer ribs. The first surface of the strip may be provided with polymer ribs extending along the outer perimeter of said gas exchange membrane. Alternatively, the first side of the strip may be provided with secondary filter membrane covering the gas exchange membrane at the first surface of the strip. The skilled person understands that spacing means as set out in relation to the first aspect of the present invention may be used to provide the filter strip according to the fourth aspect of the present invention The rib may be provided by a polymer tube or monofilament which is fixed to the first surface of the strip.

The polymer tube or monofilament, the plurality of polymer blobs or polymer ribs, the ribs possibly only along the outer perimeter of the gas exchange membrane, or the second filter membrane, create an air chamber between the outer surface of a support, such as a flexible polymer wall and the gas exchange membrane, when the filter strip is sealed to the support, e.g. a flexible polymer wall, thereby providing a sealing line between the filter strip, hence the gas exchange membrane and the outer surface of the support, e.g. flexible polymer wall. A sealed area is so created in which the support, e.g. the flexible polymer, wall may have at least one aperture.

The filter strip according to this fourth aspect of the present invention may be used to provide a recipient according to the first aspect of the present invention.

It is understood that identical features of flexible polymer walls, gas exchange membranes, apertures polymer blobs or ribs, secondary filter membranes, such as dimensions and materials, may be used to provide the filter strip.

It is also understood that the filter strip according to the fourth aspect of the invention may be used to provide a hermetically seated area comprising one fold provided in the flexible polymer wall according to embodiments of the first aspect of the present invention.

It is also understood that the filter strip according to the fourth aspect of the invention may be provided on a flexible polymer wall of a recipient, which wall is provided with bulges. The bulges, as set out above, may create the hermetically sealed air chamber between the gas exchange membrane provided by a filter strip, and the wall.

The filter strip may cover the full length or width of the recipient, especially in case the recipient is a bag. Both ends of the filter strip can be sealed with the wall of the recipient, e.g. a bag, at the time the recipient, e.g. bag, is sealed If required, several filter strips can be provided on one recipient, e.g. one bag.

According to embodiments of the present invention, the circumference of the filter strip may be provided by an elongate material. The elongate material is sealed to the gas exchange membrane along the outer perimeter of the gas exchange membrane. The sealing between the elongate material and the gas exchange membrane may be obtained by e.g. welding such as ultrasonic welding or thermal binding, by heat sealing or using adhesive such as gluing, or any other suitable method to seal the gas exchange membrane and the elongate material. The elongate material may be a polymer material. The elongate material may also be an adhesive tape.

The term "elongate material" is to be understood as a long narrow piece of material.

The filter strips cooperating with a suitable flexible polymer wall as set out above, conveniently create an air chamber between the outer surface of a flexible polymer wall and the gas exchange membrane.

According to a fifth aspect of the present invention, a polymer sheet for providing polymer recipients is provided. The polymer sheet comprises a flexible polymer wall having a first outer surface,
at least one filter strip according to the fourth aspect of the present invention as set out above.

At least part of the flexible polymer material of the first surface of the filter strip is sealed to the outer surface of the flexible polymer wall by a hermetical seal along a sealing line. The sealing line defines a hermetically sealed area of the flexible polymer wall.

The wall comprises at least one aperture being provided in the hermetically sealed area of the flexible polymer wall, wherein the spacing means creating an air chamber circumscribed by said hermetically sealed area, said hermetical seal and said gas exchanging membrane.

The polymer sheet according to the fifth aspect of the present invention has the advantage that the polymer sheet can be produced easily and in a continuous process. By simply coupling the two outer edges of the polymer sheet, e.g. thermally binding the edges to form a polymer tubular product, a recipient in the form of a bag and according to the first aspect of the present invention can be provided.

Returning to the fourth aspect of the present invention, according to embodiments of the present invention, the filter strip further comprises an elongate flexible polymer sheet covering the at least one opening and being sealed to the flexible polymer material at the first side of the filter strip along a second sealing line. This second sealing line encompasses the at least one opening. The spacing means is provided between the elongate flexible polymer sheet and the at least one gas exchanging membrane. The elongate flexible polymer sheet has at least one aperture in the area of the elongate flexible polymer sheet encompassed by the second sealing line.

The elongate flexible polymer sheet may be provided with spacing means identical to the spacing means which may be provided to the flexible polymer wall of the recipient as set out according to the first aspect of the present invention. These spacing means thus constitute the spacing means of the filter strip according to the fourth aspect of the present invention.

The elongate flexible polymer sheet may be provided with a plurality of apertures identical to the apertures, which may be provided to the flexible polymer wall of the recipient in the sealed area as set out according to the first aspect of the present invention.

Also the combination and positioning of spacing means and apertures may be identical as the combination and positioning of spacing means and apertures on the flexible polymer wall of the recipient as set out with regard to the first aspect of the present invention.

According to a sixth aspect of the present invention, a polymer sheet for providing polymer recipients is provided. The polymer sheet comprises at least a first flexible polymer wall having an outer surface and at least one filter strip comprising an elongate flexible polymer sheet as set out above. At least part of the flexible polymer material of the first surface of the filter strip is sealed to the outer surface of the first flexible polymer wall by a hermetical seal along a sealing line, the sealing line extending along one of the elongate sides of the filter strip. The polymer sheet thus is provided with a filter strip along one of its longer sides.

According to embodiments of the present invention, the polymer sheet comprises a second flexible polymer wall having an outer surface. At least part of the flexible polymer material of the first surface of the filter strip is sealed to the outer surface of said second flexible polymer wall by a hermetical seal along a sealing line which sealing line extends along the other of the elongate sides of said filter strip.

The polymer sheet thus has a filter strip, which is provided at both its elongate sides with a polymer wall.

By coupling the two polymer walls to each other at their free edges, or by coupling the free end of the first polymer wall to the second elongate side of the filter strip, a tubular polymer product being a recipient in the form of a bag and similar to the first aspect of the present invention can be provided.

An advantage of the use of the filter strip on a recipient or to provide a polymer sheet suitable to form a recipient, is that the difference in elasticity of the gas exchange membrane and the flexible polymer wall can be compensated, in particular due to the presence of the elongate flexible polymer material of the filter strip. Due to the filling of the recipient, the flexible polymer wall elongates to some extent. Gas exchanging membranes may not always elongate similarly, especially since the gas permeable membrane elongates usually less than the polymer wall. This different elongation could cause rupture of the gas exchange membranes, especially at the perimeter of the gas permeable membrane or the seat between membrane and polymer wall.

The use of a filter strip on a polymer wall has further the advantage that flexible recipients, such as bags, can easily be produced by providing the polymer wall, possibly with means for creating an air chamber, and apertures on the one hand, and the filter strip with gas exchanging membranes on the other hand. Both elements can easily be combined, by mounting, fixing such as gluing or welding the polymer wall and the filter strip.

In the particular case of the recipient being a bag, one or more filter strips may extend from the first outer end of the bag to the second outer end of the bas, all along the length of the flexible polymer wall, which may e.g. be a flexible polymer tube.

Particular and preferred aspects of the invention are set out in the accompanying independent and dependent claims. Features from the dependent claims may be combined with features of the independent claims and with features of other dependent claims as appropriate and not merely as explicitly set out in the claims.

Although there has been constant improvement, change and evolution of devices in this field, the present concepts are believed to represent substantial new and novel improvements, including departures from prior practices, resulting in the provision of more efficient, stable and reliable devices of this nature.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE DRAWINGS

FIG. 1a is a schematic view of an embodiment of the present invention in the form of a bag.

FIG. 1b and FIG. 1c is a detail of the bag of FIG. 1a.

FIG. 3b is a view of a cross section according to BB' of the bag of FIG. 3a.

FIG. 4a, FIG. 4b and FIG. 4c are schematic views of alternative embodiments of the present invention in the form of bags n.

FIG. 10 schematically shows, in top view and according to a cross section according to the plane DD, a filter strip as part of a recipient according to an embodiment of the present invention.

Figure 2:
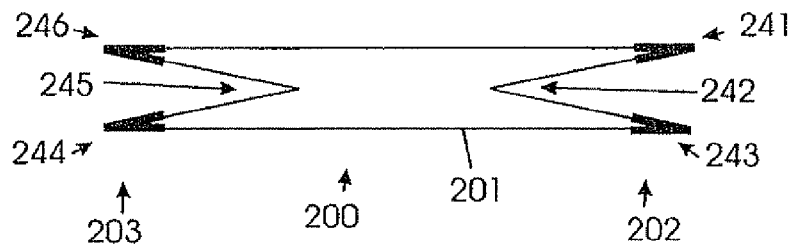
FIG. 2 is a schematic view of an alternative embodiment of the present invention in the form of a bag.

In the different figures, the same reference signs refer to the same or analogous elements.

DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Similarly, it is to be noticed that the term "coupled", also used in the claims, should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

The invention will now be described by a detailed description of several embodiments of the invention. More in particular, the invention will be explained by means of an embodiment of a recipient being a bag. It is understood that other recipients having a flexible polymer wall to contact moist substrate can be provided using the same features as will be described for the flexible polymer wall of the bags hereafter be described.

It is clear that other embodiments of the invention can be configured according to the knowledge of persons skilled in the art without departing from the true spirit or technical teaching of the invention, the invention being limited only by the terms of the appended claims.

In a first embodiment of the present invention as shown schematically in FIG. 1a, a tubular bag 100 is provided with a wall 101 made from a polymer foil. At both sides 102 and 103, the wall 101 comprises a fold according to a fold line 140. At each side 102 and 103, a gas exchanging membrane 120 is hermetically sealed to the outer surface 104 of the wall 101 along a sealing line 131, thereby providing a hermetical seal 130 between gas exchanging membrane 120 and flexible polymer wall 101. The sealing line 131 defines a hermetically sealed area 132. In the sealed area 132, a plurality of apertures 134 is provided in the wall. The gas exchanging membrane 120 is also provided with a membrane fold according to a membrane fold line 142, which membrane fold line 142 is substantially parallel to the fold line 140 of the wall 101 present in the sealed area 132.

Because of the fold line 140, for each plane perpendicular to the fold line 140 intersecting with the hermetically sealed area, an intersection line 150 is obtained with the sealed area 132. The intersection line 150 extends between two intersection points 152, being the points of intersection of this plane with the sealing line 131, which points are closest to the hermetically sealed area. The intersection line 150 has a substantially V-shape profile between the two intersection points 152. The intersection line 150 has a length Lw between the two intersection points 152.

Similarly for the gas exchanging membrane 120, because of the fold line 142, for each plane perpendicular to the fold line 140 intersecting with the gas exchanging membrane 120, an intersection line 151 is obtained with the gas exchanging membrane which has a substantially V-shape profile between the two intersection points 152. The intersection line 151 has a length Lm between the two intersection points 152. Lm is longer than Lw.

In order to provide a bag, the bag at its lower outer end 160 is closed in order to close liquid tight the wall 101 at this side of the bag. Also measures are taken to hermetically seal the sealed area 132 along the zones 162 by sealing the gas exchanging membrane to the wall at each side 102 and 103 of the outer end 160 along zones 162.

Similarly, at the upper side 170, measures are taken to hermetically seal the sealed area 132 along the zones 172, by sealing the wall and the gas exchanging membrane at each side 102 and 103 along the zone 172 of the upper outer end 170. Such measures can be taken prior to filling the bag 100 with moist substrate, or after filling the bag 100. Such measures may be the sealing of the bag itself, together with the zones 172, by e.g. gluing or welding the wall along the outer end 170, and the wall together with the gas exchanging membrane along zones 172.

In FIG. 1*b*, a detail A of side 102 is shown schematically when the bag 100 is empty. p In FIG. 1*c* the detail A of side 102 is shown schematically when the bag 100 is filled. As shown in FIG. 1*c*, the fold 140 is unfolded; thus, an angle between the legs of the V-shape profile increases. Due to the length difference between Lw and Lm, the gas exchanging membrane 120 bulges outwards of the wall, and creates an air chamber 110 between the sealed area 132 and the gas exchanging membrane 120. The distance 190 between the two fold lines 140 and 142 of the bag in the empty state may be chosen in the range of 1 to 5 mm, such as in the range of 1 to 3 mm. Preferably the difference Lm-Lw is in the range of 4% to 20% of Lm, more preferred in the range of 4% to 10% of Lm. The difference Lm-Lw is preferably chosen in the range of 1 mm to 10 mm.

As an example according to the embodiment as shown in FIG. 1*a* to 1*c*, the wall 101 is provided from a PP-, HDPE- or LDPE-foil having a thickness of 50 μm or 150 μm. To both sides 102 and 103, a gas exchanging membrane is provided from any suitable material such as TYVEC® 1057D, TYVEC® 1073D, TYVEC® 1443R or TYVEC® 1473R from DuPont. The gas exchanging membrane was folded according to a fold line, providing a V-shape profile to the gas exchanging membrane, which both legs have a length of about 25 mm. A gas exchanging membrane was glued to each of the sides of the bag along a sealing line 131 thereby providing the hermetical seal 130 between gas exchanging membrane 120 and flexible polymer wall 101 The sealing line was located at the borders of the gas exchanging membrane and had a width 181 of about 3 mm to 5 mm.

The sealed area was provided between the sealing lines according to a V-shaped profile. The fold line of the gas exchanging membrane and the fold line of the wall in the sealed area are provided substantially parallel. For each plane parallel to the fold line 140, the distance between two intersection points 152 along the sealed area is two times the length 185 of a leg which length 185 is 20 mm. The length of the intersection line along the sealed area Lw is thus 40 mm.

The distance between two intersection points 152 along the gas exchanging membrane 120 is two times the length 180 of a leg which length 180 is 22 mm The length of the intersection line along the gas exchanging membrane Lm is thus 44 mm.

The difference between Lw and Lm is thus 4 mm or 9.09% of Lm.

The distance 190 between the fold line of the wall and the fold line of the membrane is about 2 mm when the bag is in empty state.

When this alternative bag is filled with moist substrate, the distance 192 between the fold line of the wall and the fold line of the membrane is about 9.2 mm.

In an alternative embodiment, Lm is chosen in such a way that the distance 190 between the fold line of the wall and the fold line of the membrane is about 4 mm when the bag is in empty state. Lm is thus about 48 mm. The difference of Lm-Lw is about 8 mm or 16.6% of Lm When the bag is filled with moist substrate, this substrate contacting the inner side of the polymer wall of the bag along the hermetically sealing area, the distance 192 between the fold line of the wall and the fold line of the membrane is about 13.3 mm.

In the hermetically sealed area 132, a plurality of circular apertures are provided, having a diameter of about 0.5 mm to 1.6 mm, and a surface area of about 0.18 mm$^2$ to 2.00 mm$^2$. The apertures are matrix-like arranged in the sealed area 132, with a density of about 1.5 to 4 apertures per cm$^2$.

It is clear for a skilled person that other gas exchanging membranes may be used to provide alternative bags as shown in FIG. 1*a* to FIG. 1*c*. Similarly, alternative polymer foils, dimensions of the V-shape profiles of the sealed area and the gas exchanging membranes, and the number, shape and distribution of apertures may be used to provide alternative embodiments.

A bag may be provided with one or two gas exchanging membranes, or alternatively with more than two gas exchanging membranes, as shown in FIG. 2. A tubular bag 200 is provided with a wall 201 made from a polymer foil. At both sides 202 and 203, the wall 201 is provide with six folds, three at each side of the tube a fold according to a fold lines 241, 242, 243, 244, 245 and 246. Along the folds extending outwards from the bag, this is 241 and 243 at the first side 202, and 244 and 246 at the second side 203, a gas exchanging membrane is provide in a similar way as shown and described in FIG. 1*b* and FIG. 1*c*. Possibly, however not shown in FIG. 2, also the inwards folds 242 and 245 may be provided with a gas exchanging membrane being sealed along a sealing line to define a sealed area in which at least one aperture is provided. The gas exchanging membrane plied according to a fold line is provided, which fold is pointing outwards from the bag.

Such a bag has as an advantage over the bag as shown in FIG. 1*a* to FIG. 1*c*, that the volume of the bag, is larger. Also, a better distribution of the exchanged gas is obtained because the apertures are more distributed along the wall. The filled bag also has a more cube-like shape, which enables easier storage of more moist substrate.

Figure 3A:
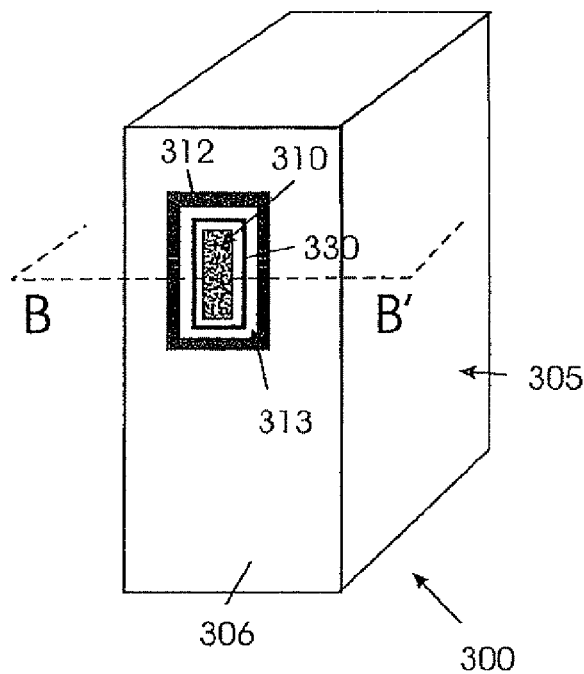
FIG. 3a is a schematic view of another embodiment of the present invention in the form of a bag.

Another embodiment of a bag 300 as subject of the present invention is schematically shown in FIG. 3*a*. A cross section along a plane BB' is shown in FIG. 3*b*.

The polymer foil of the bag 300 provides a wall 305. The moist substrate is to contact the inner side of the polymer wall of the bag along the hermetically sealing area when the bag is filled. The wall 305 is provided with an aperture 310. At the outer surface 306, a gas exchanging membrane 320 is provided, covering the aperture 310 and being sealed along a sealing line 312 providing the hermetically sealed area 313 and a hermetical seal 314 between gas exchanging membrane 320 and flexible polymer wall 305. The polymer wall and the gas exchanging membrane are identical as the ones used for the embodiment described in FIG. 1 and FIG. 2.

Along the edge of the aperture 310 the wall is provided with a spacing means 330, being a raised edge. The gas exchanging membrane 320 is forced outwards and spaced from the wall 305. Between gas exchanging membrane 320 and wall, an air chamber 340 is created. When the bag 300 is filled with moist substrate, the moist substrate 360 will not extend into the air chamber, if the aperture is not too big. The maximum size of the aperture 310 depends on the type of substrate used to fill the bag. Alternatively the aperture is covered with a secondary filter membrane, which is then allowed to be moistened, or with an air permeable stopper means, preventing the moist substrate to leave the polymer flexible wall, such as e.g. a very open woven gauze or non woven. The height 390 of the air chamber 340 is preferably in the range of 0.2 mm to 10 mm such as in the range of 1 mm to 10 mm, e.g. in the range of 0.2 mm to 5 mm or such as in the range of 1 mm to 5 mm Alternatively the raised edge may be replaced by any other form of protuberance such as a polymer rib provided to the gas exchanging membrane along the outer perimeter of the gas exchange membrane. The rib may be provided in an identical position as the raised edge in FIG. 3a and FIG. 3b, but forms now an integral part with the gas exchange membrane.

Figure 3B:
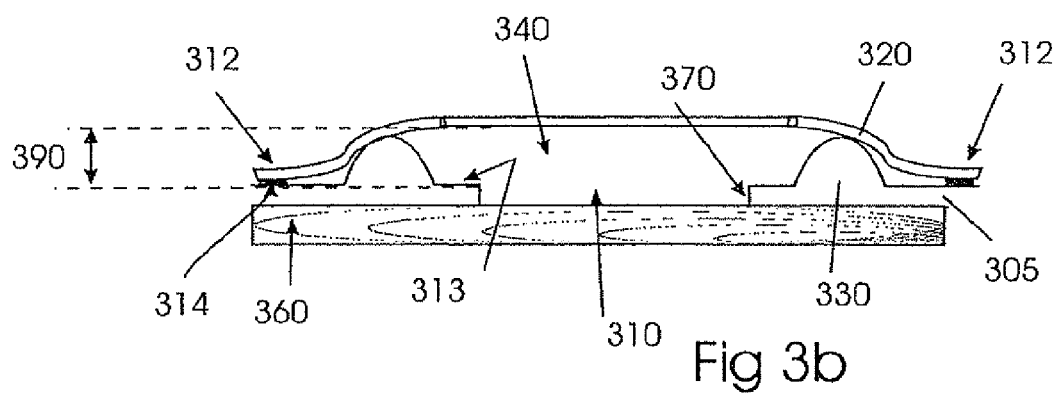

The bag may be provided with a plurality of apertures, each being covered by a gas exchanging membrane as shown in FIG. 3b. It is understood that according to the invention, the aperture 310 may be replaced by a number of smaller apertures, all being located within the area circumscribed by the raised edge 330.

Several alternative embodiments will hereafter be explained by making use of cross sections of a bag according to a plane CC' as shown in FIG. 4a and FIG. 4b. In FIG. 4a, a bag 401 has a wall 405. Moist substrate is to contact the inner side of the polymer wall of the bag along the hermetically sealing area when the bag is filled with moist substrate. The polymer wall and the gas exchanging membrane are identical as the ones used for the embodiment described in FIG. 1 and FIG. 2. The wall is provided with a plurality of apertures 410, in this case being slit-like apertures in a given direction. Preferably a multitude of slits with a short length may be provided, all slits being aligned according to a line in the given direction. A gas exchanging membrane 406 is provided covering the apertures. The gas exchanging membrane is sealed to the outer surface of the wall 405 along a sealing line 420 thereby providing a hermetical seal 421 between gas exchanging membrane 406 and flexible polymer wall 405. Within the sealing line, a hermetically sealed area 430 is obtained. Between the apertures, a spacing means 440 is provided. The spacing means are line-like spacing means, extending between adjacent apertures. The moist substrate 460 is provided at the inner side of the wall 405.

In FIG. 4b, a bag 402 is provided. The same reference numbers refer to the same features. The apertures in this embodiment are circular apertures provided within the sealed area in an array, e.g. in a matrix-like arrangement. Between the apertures, a spacing means 440 is provided, which spacing means are point-like spacing means, which can be arranged in an array, e.g. matrix-like arranged in the sealed area.

In the hermetically sealed area 430, a plurality of circular or line-like apertures may be provided, having a diameter or width of about 0.5 to 1.6 mm.

In FIG. 4c, a bag 403 is provided. The same reference numbers refer to the same features. The apertures in this embodiment are circular apertures provided within the sealed area 451 in matrix-like arrangement. Between the apertures, a spacing means 440 is provided, which spacing means are point-like spacing means, matrix-like arranged in the sealed area having a diameter of about 0.5 to 1.6 mm. In the circular hermetically sealed area 451, a plurality of circular apertures may be provided, having a diameter of about 0.5 to 1.6 mm. The plurality of apertures are in an array, e.g. in a matrix-like arrangement and arranged between the plurality of point-like spacing means. The bag 403 may be provided with a plurality of hermetically sealed areas 451, e.g. circular ones.

Several embodiments of the spacing means will hereafter be shown in FIG. 5, FIG. 6, FIG. 7a and FIG. 7b, making use of the same cross section along a plane CC' of both bags 401 and 402. The cross sections along the plane CC' of both bags are similar. Identical reference numbers refer to the same features as in FIG. 4a and FIG. 4b.

Figure 5:
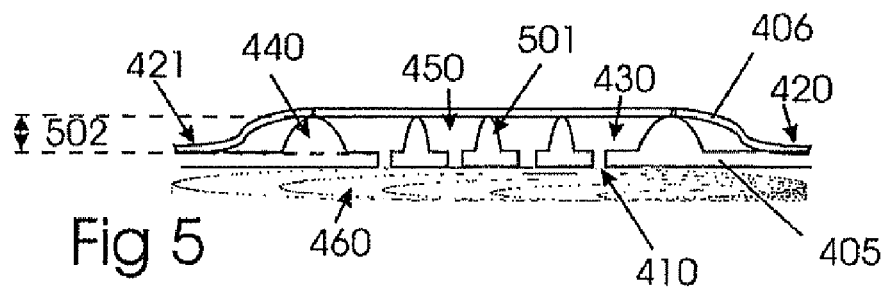
FIG. 5, FIG. 6, FIG. 7a and FIG. 7b are a cross sections according to CC' of the bag of either FIG. 4a or FIG. 4b.

In FIG. 5, the spacing means 440 is provided by a plurality of bulges 501, which are located between the apertures 410. The bulges may be local thickenings of the polymer foil. The bulges 501 may have the form of studs having preferably a circular basis, having a diameter of 1 mm to 5 mm.

Alternatively, the bulges may be rectangular, square or any other suitable form. Such bulges would correspond to the spacing means 440 of the bag as shown in FIG. 4b or FIG. 4c. Alternatively, the bulges may be line-like having a width of 1 mm to 5 mm. Such bulges would correspond to the spacing means 440 the bag as shown in FIG. 4a.

The bulges may have a thickness 502 in the range of 0.2 mm to 5 mm such as in the range of 1 mm to 5 mm, such as 3 mm. The bulges 501 space the gas exchanging membrane 406 from the wall 405 in the sealed area 430, creating an air chamber 450 having a height equal to the thickness 502.

The bulges, especially when line-like, may e.g. be provided during extrusion of the polymer foil as processed subsequently.

Figure 6:
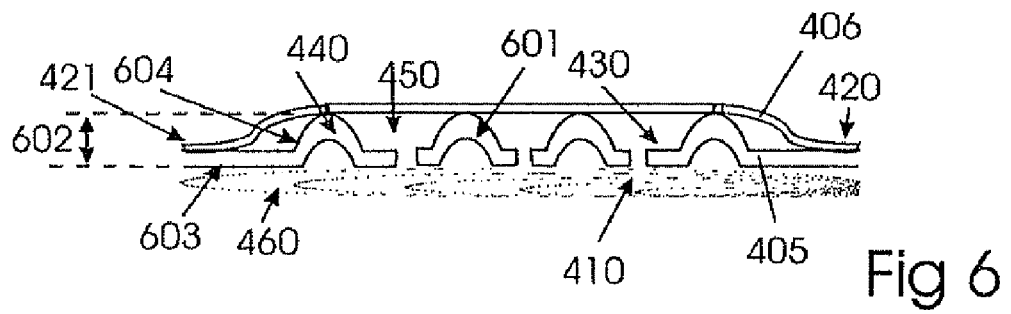

In FIG. 6, the spacing means 440 is provided from a plurality of bulges 601, which are located between the apertures 410. The bulges 601 may be provided by a profile of the polymer foil at the outer side 604 which profile is obtained by imprinting the profile at the inner side 603 of the wall 405 in the sealed area 430. The bulges 601 may have the form of studs having preferably a circular basis, having a diameter of 1 mm to 5 mm. Such bulges would correspond to the spacing means 440 of the bag as shown in FIG. 4b of FIG. 4c. The bulges are matrix-like arranged in the sealed area. The plurality of apertures are in the form of an array, e.g. matrix-like arranged between the bulges.

Alternatively the bulges may be line-like having a width of 1 mm to 5 mm. Such bulges would correspond to the spacing means 440 of the bag as shown in FIG. 4a.

The bulges may have a thickness 602 in the range of 0.2 mm to 5 mm, such as in the range of 1 mm to 5 mm, such as 3 mm.

This embodiment has the advantage that the apertures and bulges may be provided during an additional operational step while providing the bag. The bulges, e.g. in the form of studs or substantially parallel lines, possibly arranged according to quincunx, can be provided by pressing a die to the foil, thereby impressing and providing a profile to the foil surface. The apertures and bulges can be provided by pressing one die (for both punching apertures and impressing profile) to the foil surface or by using two consecutive, separate dies (one punching the apertures, the other die impressing the foil) acting on the foil surface. The bulges 601 space the gas exchanging membrane 406 from the wall 405 in the sealed area 430, creating an air chamber 450 having a height equal to the thickness 602.

Figure 7A:
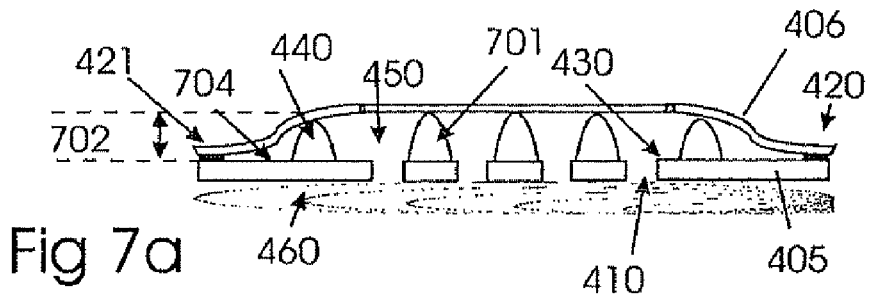
Figure 7B:
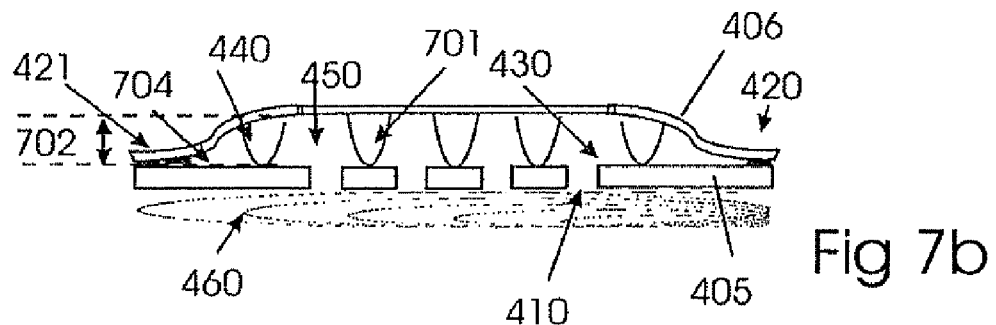

In FIG. 7a, the spacing means 440 is provided by a plurality of blobs or ribs 701 of polymer material, which are located between the apertures 410. The blobs or ribs are provided at the outer surface 704 of the polymer foil. The blobs 701 may have a circular basis with a diameter of 1 mm to 5 mm. Such blobs would correspond to the spacing means 440 of the bag as shown in FIG. 4b. The blobs are in an array, e.g. matrix-like arranged in the sealed area.

Alternatively the spacing means may be line-like ribs having a width of 0.5 mm to 5 mm. Such ribs would correspond to the bag as shown in FIG. 4a.

The plurality of apertures are in an array, e.g. matrix-like arranged between the blobs or the ribs.

The blobs or ribs may have a thickness 702 in the range of 0.2 mm to 5 mm such as in the range of 1 mm to 5 mm, such as 3 mm. As an alternative, shown in FIG. 7b, the blobs or ribs may be provided at the inner surface 710 of the gas exchanging membrane instead of being provided on the inner side of the wall. The blobs or ribs 701 space the gas exchanging membrane 406 from the wall 405 in the sealed area 430, creating an air chamber 450 having a height equal to the thickness 702.

Figure 8:
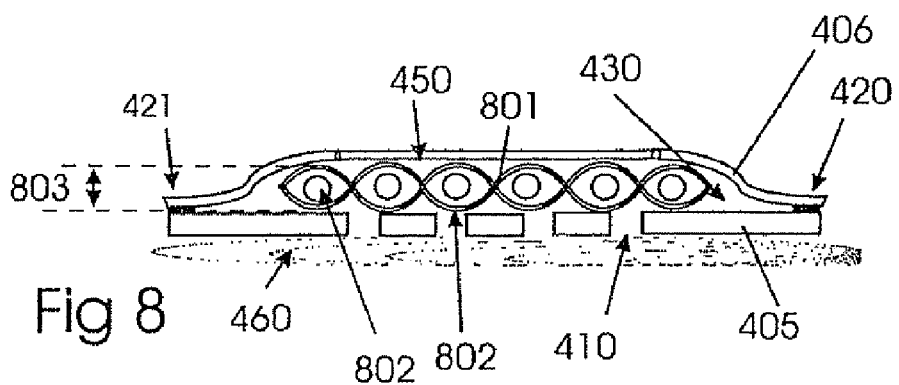
FIG. 8 shows a cross section of an alternative embodiment of the present invention in the form of a bag, which cross section is made along a plane similar to CC'.

A further embodiment of a bag as subject of the present invention is schematically shown in FIG. 8. A wall 405 and a gas exchanging membrane 406 are assembled in substantially similar way as shown in FIG. 4a or FIG. 4b. The polymer wall and the gas exchanging membrane are identical as the ones used for the embodiment described in FIG. 1 and FIG. 2. However, instead of the spacing means 440 being line-like spacing means as shown in FIG. 4a or point-like spacing means as shown in FIG. 4b, a gauze 801 is provided between the gas exchanging membrane 406 and the wall 45 in the sealed area 430 of the bag. A gauze 801 from polymer monofilaments 802 is provided, e.g. as a woven fabric. The polymer monofilaments are preferably made hydrophobic or water repellent, in order to avoid moisture being drained from the moist substrate to the gas exchanging membrane 406 due to capillary effects. The thickness 803 is preferably in the range of 3 mm to 10 mm. The filaments used to provide the gauze are made from similar polymer material as used for the bas wall, e.g. PP, PES, PA, HDPE or LDPE. The filaments may have a diameter of about 0.2 mm to 1.0 mm. The gauze 801 spaces the gas exchanging membrane 406 from the wall 405 in the sealed area 430, creating an air chamber 450 having a height equal to the thickness 803.

As an alternative the gauze 801 is replaced by a water repellent nonwoven, preferably having a thickness in the range of 3 mm to 10 mm. The nonwoven is made from polymer staple fibers or filaments, which fibers or filaments are thermally, mechanically of chemically bonded to each other. The filaments are of much finer diameter (e.g. ranging from 1 μm to 200 μm, e.g. 30 μm) as compared to the filaments used for the gauze 801.

Figure 9A:
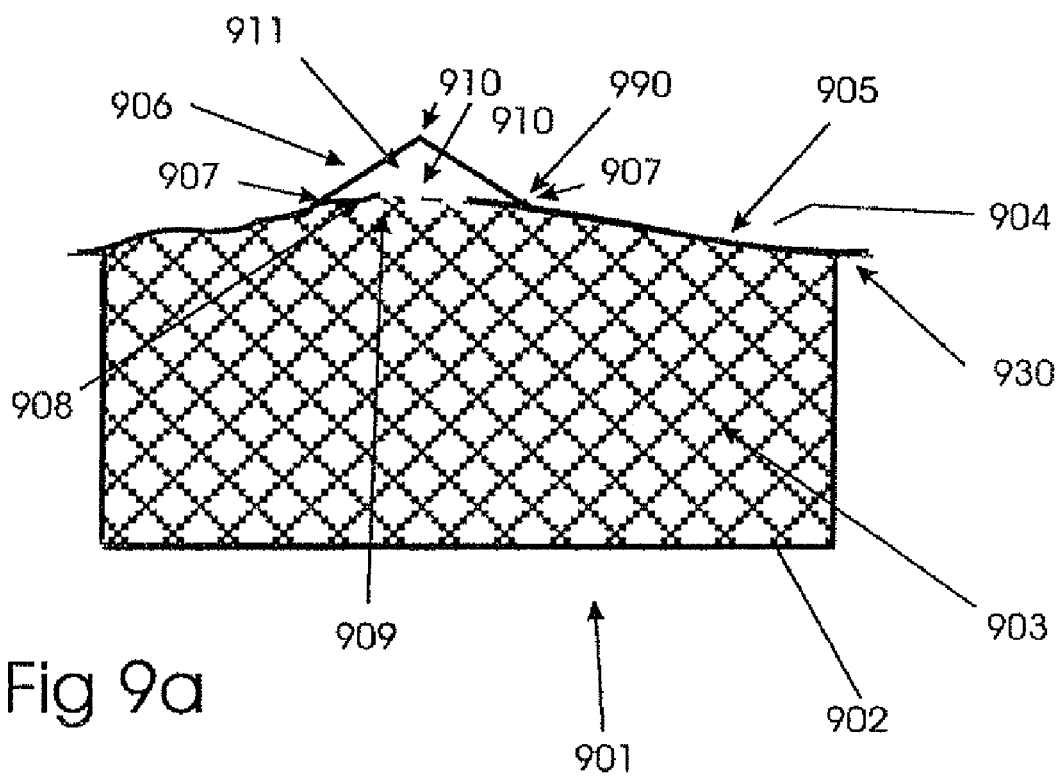
FIG. 9a and FIG. 9b are schematic views of alternative embodiments of the present invention in the form of recipients.
Figure 9B:
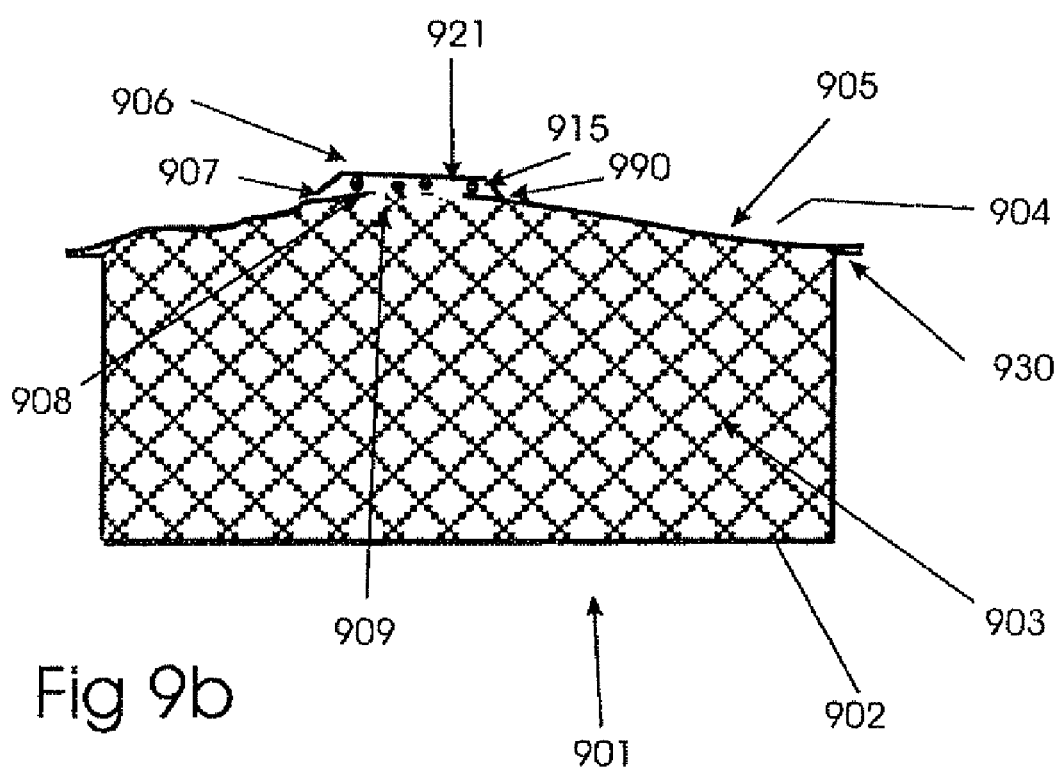

An alternative embodiment of a recipient is disclosed in FIG. 9a and FIG. 9b. FIG. 9a and FIG. 9b disclose a cross section along a vertical plane of a recipient 901, being a rigid box 902 out of rigid polymer construction. The box is filled with moist substrate 903, the box is provided at the upper side 904 with a flexible polymer wall 905, which is provided with a gas exchanging membrane 906. The gas exchanging membrane 906 is sealed to the flexible polymer wall 905 along a sealing line 907, so providing a hermetically sealed area 908 and a hermetical seal 990 between gas exchanging membrane 906 and flexible polymer wall 905. In the hermetically sealed area 908, a plurality of apertures 909 are provided. The rigid box 902 and the flexible polymer wall are coupled to each other along the edges 930 of the polymer wall thereby preventing ambient air to enter the box via the edge 930.

In FIG. 9a, the polymer wall 905 and the gas exchanging membrane 906 are provided with a fold according to fold lines 910. When the polymer wall is provided to the recipient 901 to cover the moist substrate, while the polymer wall is contacting the moist substrate along the sealed area 908, the folds are unfolded and an air chamber 911 is provided between the outer surface of the sealed area and the gas exchanging membrane 906. This air chamber 911 is provided by means of the same features as is explained in FIG. 1a, FIG. 1b and FIG. 2, as a result, the moist substrate is prevented to moisten the gas exchanging membrane and hence contamination of the moist substrate is avoided.

In FIG. 9b, the polymer wall 905 and the gas exchanging membrane 906 are provided with a spacing means 915, which spacing means may be one of the spacing means as set out in FIG. 3a, FIG. 3b, FIG. 4a, FIG. 4b, FIG. 4c, FIG. 5, FIG. 6, FIG. 7a, FIG. 7b or FIG. 8. When the polymer wall is provided to the recipient 901 to cover the moist substrate, an air chamber 921 is provided between the outer surface of the sealed area and the gas exchanging membrane 906. As a result, the moist substrate is prevented to moisten the gas exchanging membrane and hence contamination of the moist substrate is avoided.

Turning to FIG. 10, a filter strip according to the fourth aspect of the present invention is shown.

In FIG. 10, it is shown how the strip 1700 is combined with a flexible polymer wall 1111, in order to provide a recipient 2000 according to the first aspect of the present invention.

The filter strip 1700 comprises a first surface 1003, which will be oriented to the outer surface of the polymer wall 1111. The filter strip has a second surface 1004 which will be oriented away from the polymer wall 1111. The filter strip 1700 comprises an elongate flexible polymer material 1006 comprising at least one opening 1106. The filter strip 1700 comprising at least a first, and in this particular case more than one gas exchanging membrane 1010 allowing gas to pass from one of the first and second surface of the strip to the other of the first and second surface of the strip. The gas exchanging membrane 1010 is coupled to the elongate flexible polymer material 1006 along a first sealing line 1107 and covers the at least one opening 1106.

Between the elongate flexible polymer material 1006 of the filter strip 1700 and the polymer wall 1111 two substantially parallel ribs 1013 are provided. Each of the ribs 1013 extend along the outer perimeter of the elongate flexible polymer material 1006. The ribs may be provided as a polymer monofilament or a polymer tube having a diameter sufficiently thick to provide the air chamber when the filter strip is adhered to a flexible polymer wall.

Alternatively a secondary filter membrane is provided against the part of the first surface 1003 provided by the gas exchange membrane. The first surface 1003 of the strip 1700 is provided with means 1020 along the circumference 1002 of the strip which improves the sealing ability of the filter strip to the flexible polymer wall. The means 1020 may be a means facilitating thermal binding, heat sealing, adhesion, etc. The coupling of the flexible polymer material and the flexible polymer wall provides a sealing line 1131 between the filter strip and the polymer wall, hence providing a sealed area with a sealing line 1131, encompassing the apertures 1112 of the polymer wall. The elongate flexible polymer material hence provides a hermetical seal 1130 between flexible polymer wall 1111 and the gas exchange membrane 1010 of the filter strip 1700.

The filter strip is so sealed to the flexible polymer wall that no aperture is to be located outside the hermetically sealed area.

The two ribs now function as a means for creating an air chamber 1115 circumscribed by the hermetically sealed area 1114, the hermetical seal 1130, the sealing line 1131 and the gas exchanging membrane 1010. The moist substrate is prevented from contacting the gas exchange membrane 1010.

The filter strip is provided and fixed, i.e. sealed to the polymer wall prior to filling the recipient with moist substrate 1113.

The use of such filter strip according to the fourth aspect of the present invention has the advantage that during filling and after being filled, the polymer wall of the recipient will extend and will be extended, dependent on the amount of substrate provided in the recipient. This extension will elongate the polymer wall to some extent. The gas exchange membranes are usually less extensible than the polymer wall. Using the filter strips according to the present invention, the difference in elongation of gas exchange membranes and polymer wall is compensated by the presence, hence the elongation of the elongate flexible polymer material.

It is clear that the provision of one or more openings in the elongate flexible polymer material covered with gas exchanging membranes is sufficient for allowing gas to exchange between moist substrate and ambient. The gas exchanging membranes are not to be present along all apertures in the polymer wall. It is sufficient that each aperture is linked with a gas exchanging membrane via an air chamber encompassed by a sealed area.

Figure 11A:
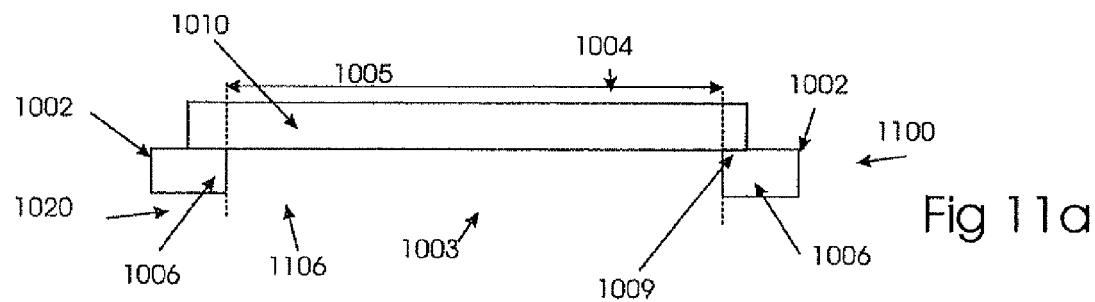
FIG. 11a to FIG. 11c schematically show different filter strips according to embodiments t of the present invention.
Figure 11B:
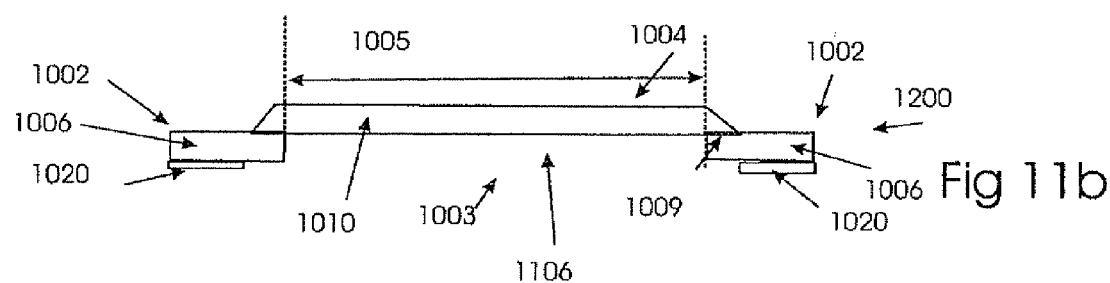
Figure 11C:
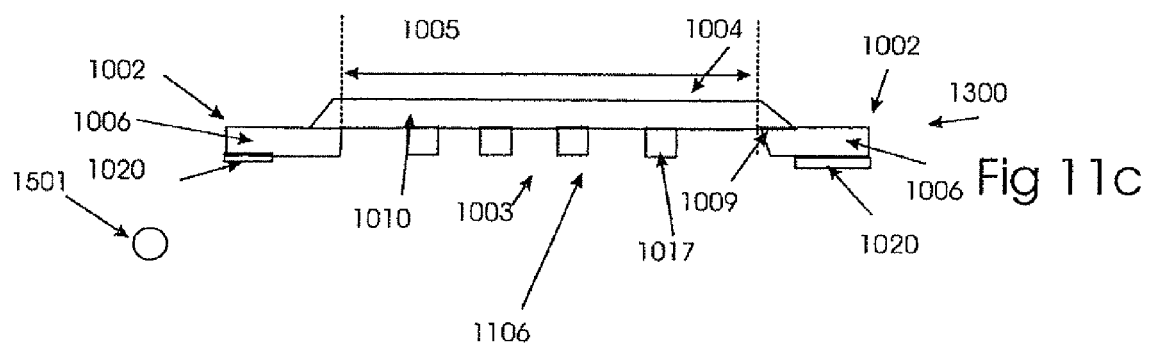

The skilled person understands that in a similar way as for strip 1700, a recipient according to the first aspect can be obtained by combining a flexible polymer wall with a strip according to the fourth aspect, such as the strips as shown in FIG. 11a to FIG. 11c.

FIG. 11a shows an alternative filter strip 1100 comprising a gas exchange membrane 1010. The strip 1100 has a circumference 1002, a first surface 1003 and a second surface 1004. The gas exchanging membrane allows gas to pass from one surface to the other surface, since it comprises a zone 1005 where the first and second surface are free, i.e. nothing is to contact the first or second surface. The strip 1100 comprises an elongate flexible polymer material 1006. The elongate flexible polymer material 1006 has at least one opening 1106. The opening 1106 is covered by the gas exchanging membrane 1010. The gas exchange membrane and the elongate flexible polymer wall are sealed to each other along the perimeter 1009 of the gas exchange membrane.

FIG. 11b shows filter strip 1200 substantially identical to the filter strip 1100, which strip 1200 comprising a gas exchange membrane 1010. The first surface 1003 of the strip 1100 is provided with means 1020 being a coupling or sealing promoter, along the circumference 1002 of the strip, this is along the elongate material 1006. The means 1020 can be an adhesive, an outer layer adapted for heat sealing, etc.

FIG. 11c shows filter strip 1300 substantially identical to the filter strip 1100. The first surface 1003 of the strip 1300 is further provided with a plurality of polymer blobs or polymer ribs, in this particular embodiment a plurality of ribs 1017 which extend in the longitudinal direction 1501 of the strip.

The gas exchanging membrane allows gas to pass from one surface to the other surface, as at least the surface between the plurality of ribs are free. The plurality of polymer blobs or polymer ribs, in this particular embodiment a plurality of ribs 1017 constitute a spacing means for avoiding contact between the gas exchanging membrane 1010 and a support when the flexible polymer material 1006 present at the first surface of the filter strip is sealed to a support, such as a polymer sheet or a flexible polymer wall. Alternative spacing means such as a gauze from polymer monofilaments e.g. as a woven fabric or water repellent nonwoven, may be coupled to the first side of the filter strip.

The flexible polymer material to provide the elongate flexible polymer material of the strip may be similar or identical material as used for the polymer wall of the recipient according to the present invention. The gas exchanging membrane of the filter strip are similar or identical membranes as of the recipient of the present invention.

Figure 12:
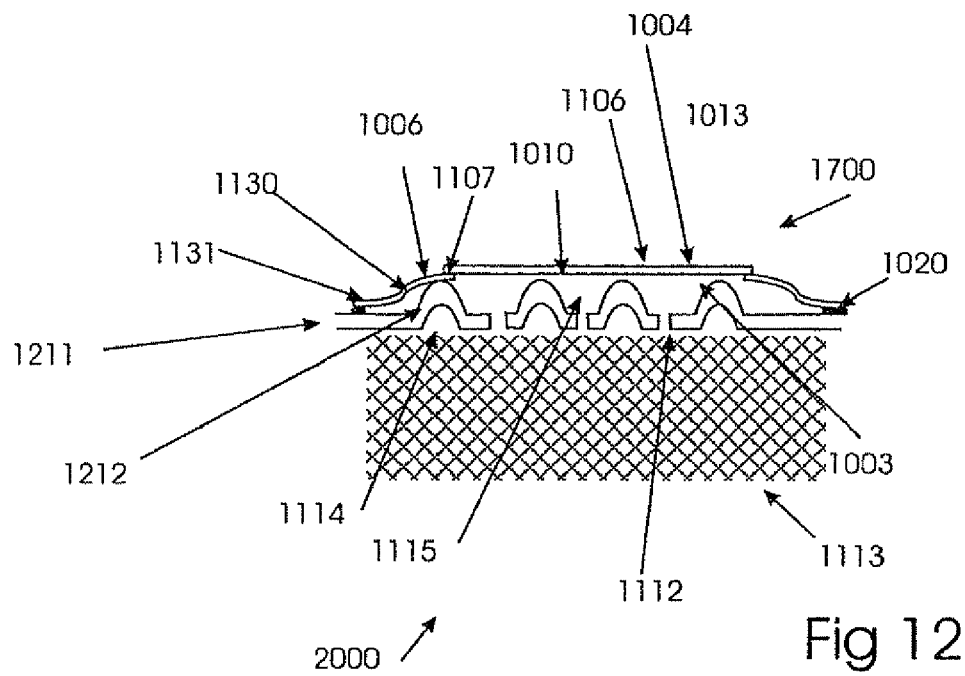
FIG. 12 schematically shows an alternative filter strip according to an embodiment of present invention used to provide a recipient.

An alternative use of the filter strip 1700 used to provide a recipient 2000 is shown in FIG. 12. Identical references used in FIG. 10 refer to identical features in FIG. 12.

The flexible polymer wall 1111 of recipient 2000 is replaced by a flexible polymer wall 1211, which is provided with a plurality of bulges 1212, identical as the bulges discloses in relation to FIG. 6. The bulges constitutes the spacing means for spacing the gas exchange membrane 1010 from the flexible polymer wall 1211, hence to create an air chamber 1115 circumscribed by the hermetically sealed area 1114, the hermetical seal 1130, the sealing line 1131 and the gas exchanging membrane 1010. The moist substrate is prevented to contact the gas exchange membrane 1010.

The skilled man understands that the filter strip 1700, 1100, 1200 or 1300 as shown in FIG. 10 respectively FIG. 11a, FIG. 11b and FIG. 11c and FIG. 12 may be used as alternative for the gas exchange membranes as shown in FIGS. 1a, 1b, 1c, 2, 3a, 3b, 4a, 4b, 4c, 5, 6, 7a, 7b, 8, 9a and 9b. The elongate flexible polymer material of the filter strip is used to couple, e.g. seal the filter strip to the flexible polymer wall of the recipient. By this coupling, the elongate flexible polymer material provide a hermetical seat between the gas exchanging membrane and the flexible polymer wall of the recipient. This coupling may be obtained by using adhesives or by thermal binding or any other suitable coupling technique. This coupling provides the hermetical seal along the sealing line. It is understood that, according to the present invention, the apertures in the flexible polymer wall of the recipient are to be encompassed by a sealing line.

Figure 13:
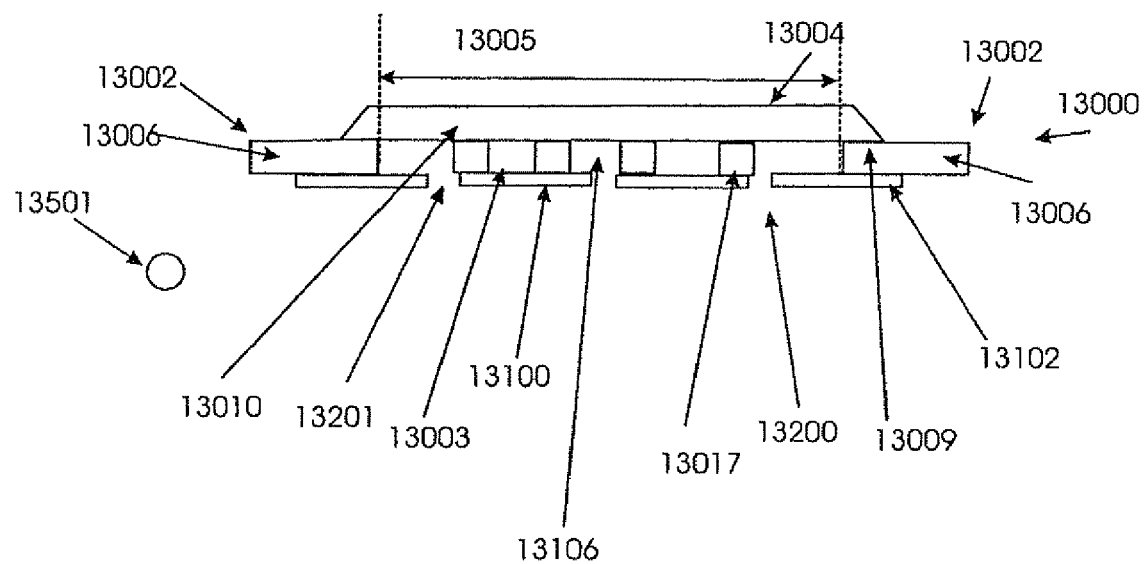
FIG. 13 schematically shows an alternative filter strip according to an embodiment of the present invention.

FIG. 13 shows an alternative filter strip 13000 comprising a gas exchange membrane 13010. The strip 13000 has a circumference 13002, a first surface 13003 and a second surface 13004. The gas exchanging membrane allows gas to pass from one surface to the other surface, since it comprises a zone 13005 where the first and second surface are free, i.e. nothing is to contact the first or second surface. The strip 13000 comprises an elongate flexible polymer material 13006. The elongate flexible polymer material 13006 has at least one opening 13106. The opening 13106 is covered by the gas exchanging membrane 13010. The gas exchange membrane and the elongate flexible polymer wall are sealed to each other along the perimeter 13009 of the gas exchange membrane.

The first surface 13003 of the strip 13000 is further provided with a plurality of polymer blobs or polymer ribs, in this particular embodiment a plurality of ribs 13017 which extend in the longitudinal direction 13501 of the strip. The gas exchanging membrane allows gas to pass from one surface to the other surface, as at least the surface between the plurality of ribs are free. The plurality of polymer blobs or polymer ribs, in this particular embodiment a plurality of ribs 13017 constitute a spacing means for avoiding contact between the gas exchanging membrane 13010 and a support when the flexible polymer material 13006 present at the first surface of the filter strip is sealed to a support, such as a polymer sheet or a flexible polymer wall. Alternative spacing means such as a gauze from polymer monofilaments e.g. as a woven fabric or water repellent nonwoven, may be coupled to the first side of the filter strip.

FIG. 13 thus shows a filter strip 13000 having a first surface 13003 and a second surface 13004. At least part of the flexible polymer material 13006 present at the first surface 13003 of the filter strip 13000 is suitable for being sealed to a support, e.g. a polymer sheet or a polymer wall of a recipient.

The spacing means avoids contact between the gas exchanging membrane and the support when the flexible polymer material of the first surface of the filter strip is sealed to the support.

The filter strip 13000 further comprising an elongate flexible polymer sheet 13100 covering the opening and being sealed to the flexible polymer material at the first side of the filter strip along a second sealing line 13102 encompassing the opening. The spacing means is provided between the elongate flexible polymer sheet and the gas exchanging membrane. The elongate flexible polymer sheet is provided with a plurality of apertures 13201 in the area 13200 of the elongate flexible polymer sheet encompassed by the second sealing line.

Figure 14:
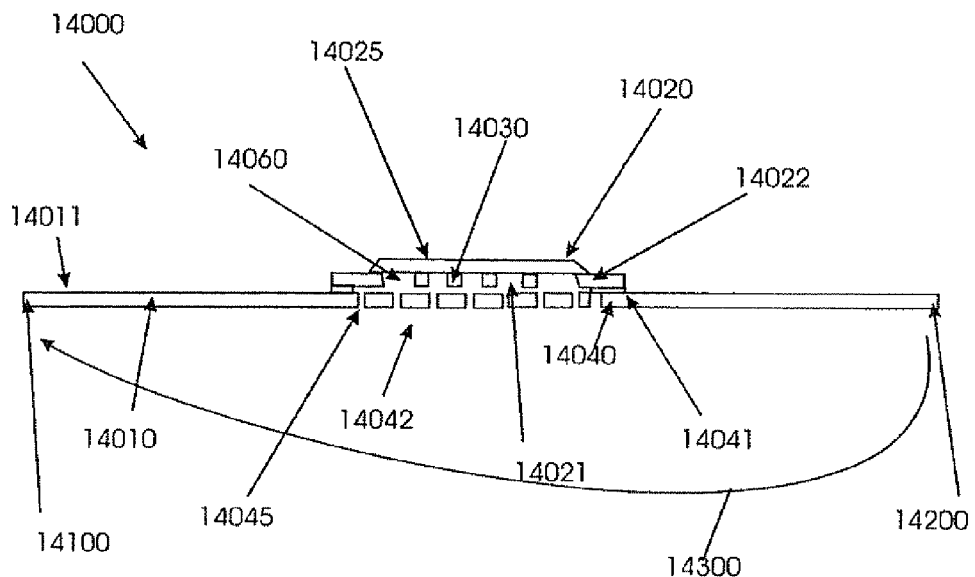
FIGS. 14 and 15 schematically show polymer sheets according to an embodiment of the present invention.

Turning to FIG. 14, a polymer sheet 14000 is shown. The polymer sheet comprises a flexible polymer wall 14010 having a first outer surface 14011 and a filter strip 14020, being a filter strip as shown in figure lie comprising a spacing means 14030. At least part of the flexible polymer material 14022 of the first surface 14021 of the filter strip is sealed to the outer surface 14011 of the flexible polymer wall 14010 by a hermetical seal 14040 along a sealing line 14041. The sealing line defines a hermetically sealed area 14042 of the flexible polymer wall 14010.

The wall comprises aperture 14045 being provided in the hermetically sealed area of the flexible polymer wall. The spacing means, in this particular case a number of polymer ribs, creates an air chamber 14060 circumscribed by the hermetically sealed area, the hermetical seal and the gas exchanging membrane 14025 of the filter strip 14020. The polymer sheet has two outer edges 14100 and 14200. When these outer edges are brought to each other (as indicated by arrow 14300) and coupled, e.g. sealed to each other, a tubular structure is obtained which can be used to provided recipients, more particular bags. This may be done by cutting the tubular product into defined lengths and seal the outer ends of the tubular products. A recipient according to the first aspect of the present invention is so obtained.

Figure 15:
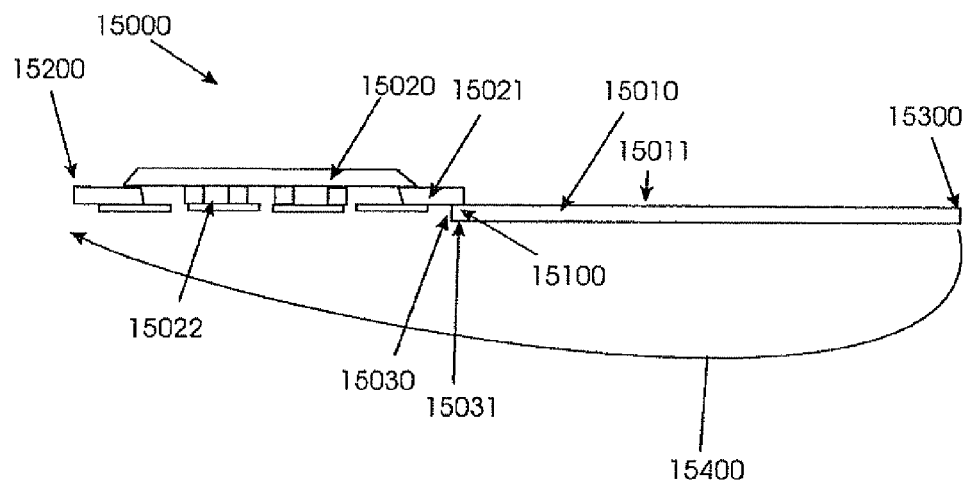

Turning to FIG. 15, a polymer sheet 15000 is shown. The polymer sheet comprises a flexible polymer wall 15010 having a first outer surface 15011 and a filter strip 15020 identical to the filter strip as shown in FIG. 13. At least part of the flexible polymer material 15021 of the first surface 15022 of the filter strip 15020 is sealed to said outer surface 15011 of the first flexible polymer wall by a hermetical seal 15030 along a sealing line 15031. The sealing line extends along one of the elongate sides 15100 of said filter strip 15010.

By coupling the free end 15300 of the first polymer wall 15010 to the second elongate side 15200 of the filter strip (as indicated with arrow 15400), a tubular polymer product being a recipient in the form of a bag may be provided.

All above-mentioned embodiments of recipients, such as containers or bags, may be used to cultivate mushroom spawn or fungi. The moist substrate with the spawn or spores of fungi is brought into the bag. The recipient or bag is filled completely with such moist substrate. The recipients or bags, once closed are stored in an appropriate environment for cultivating the mushroom spawn or fungi. The recipients or bags as subject of the present invention will allow gas exchange between moist substrate and environment, while bacteria and foreign fungi are prevented to migrate through the gas exchanging membrane towards the substrate. Once the cultivated product is harvested, the recipients or bags may be disposed. In case of recipients comprising other than polymer flexible wall elements, these other elements may possibly be cleaned and reused.

It was found that all the above-mentioned embodiments have the advantage that contact between gas exchanging membrane and moist substrate is prevented even when the bag is filled completely with moist substrate. The gas exchanging membrane is kept dry, which prevents spores of fungi and bacteria to migrate through the gas exchanging membrane towards the moist substrate. As the gas exchanging membrane is kept dry, the rate of gas exchanged by the gas exchanging membrane is substantially constant. The air chamber is so-to-say an additional barrier between moist substrate and ambient.

It was also found that the above-mentioned embodiments, when used to contain powder-like substrate which is to exchange gasses or "breathe" during retention in the recipient, benefits having similar advantages as when using the moist substrate are obtained. Again, the air chamber is so-to-say an additional barrier between substrate and ambient, preventing the substrate to contact the, now possibly more humid gas filter membrane. By avoiding this contact, spores of fungi and bacteria are prevented to migrate through the gas exchanging membrane towards the substrate.

It is to be understood that although preferred embodiments, specific constructions and configurations, as well as materials, have been discussed herein for devices according to the present invention, various changes or modifications in form and detail may be made without departing from the scope and spirit of this invention.

The invention claimed is:

1. A recipient for containing a substrate, said recipient comprising
a flexible polymer wall having an outer surface and an inner surface for contacting the substrate,
at least one gas exchanging membrane, said gas exchanging membrane being coupled to said outer surface of said flexible polymer wall by a hermetical seal along a sealing line, said sealing line defining a hermetically sealed area of said flexible polymer wall, said wall comprising at least one aperture being provided in said hermetically sealed area of said flexible polymer wall, wherein said recipient further comprises a means for creating an air chamber circumscribed by said hermetically sealed area, said hermetical seal and said gas exchanging membrane, for preventing the substrate to contact said gas exchange membrane when said recipient is filled with the substrate thereby bringing the substrate into contact with said hermetically sealed area of said flexible polymer wall at an inner surface of said flexible polymer wall; and
wherein said air chamber is created at least in part upon filling said recipient with substrate.

2. A recipient for containing moist substrate according to claim 1, wherein said gas exchanging membrane is hermetically sealed to said outer surface of said flexible polymer wall along said sealing line for providing said hermetical seal.

3. A recipient for containing moist substrate according to claim 1, wherein said recipient comprises a filter strip having a first surface and a second surface, said filter strip comprising an elongate flexible polymer material comprising at least one opening, the filter strip comprising said at least a first gas exchanging membrane allowing gas to pass from one of the first and second surface of the strip to the other of the first and second surface of the strip, said gas exchanging membrane being coupled to said elongate flexible polymer material along a first sealing line, said first gas exchange membrane covering said at least one opening, said first outer surface of said elongate flexible polymer material is coupled to said outer surface of said flexible polymer wall along said sealing line for providing said hermetical seal.

4. A recipient according to claim 1, wherein said means for creating an air chamber comprises at least one fold in said flexible polymer wall being folded according to a fold line, at least a part of said at least one fold being located in said hermetically sealed area, said fold being provided for being unfolded when said recipient is filled with the substrate, wherein for each section according to a plane perpendicular to said fold line, a first and a second intersection point are provided at the points where the plane and said sealing line intersect, the line of intersection of said wall and the plane between said intersection points having a length Lw, the line of intersection of said gas exchanging membrane and the plane between said intersection points having a length Lm, said Lw being smaller than Lm.

5. A recipient according to claim 4, wherein said gas exchanging membrane is folded according to a membrane fold, said membrane fold being substantially parallel to said fold being located in said hermetically sealed area.

6. A recipient according to claim 4, wherein the line of intersection with said hermetically sealed area has a substantially V- shape profile.

7. A recipient according to claim 4, wherein the line of intersection with said gas exchanging membrane has a substantially V- shape profile.

8. A recipient according to claim 4, wherein Lm-Lw is in the range of 1 mm to 10 mm.

9. A recipient according to claim 4, wherein Lm-Lw is in the range of 4% to 20% of Lm.

10. A recipient according to claim 4, wherein said sealed area is provided with a plurality of apertures.

11. A recipient according to claim 1, wherein said means for creating an air chamber comprises a spacing arrangement located between said gas exchanging membrane and said hermetically sealed area of said flexible polymer wall.

12. A recipient according to claim 11, wherein said spacing arrangement comprises a gauze, said gauze being preferably made from polymer filaments.

13. A recipient according to claim 12, wherein said gauze comprises a woven, braided or knitted gauze.

14. A recipient according to claim 12, wherein said spacing arrangement has a thickness in the range of 0.1 mm to 10 mm.

15. A recipient according to claim 11, wherein said spacing arrangement comprises a non woven.

16. A recipient according to claim 11, wherein said spacing arrangement comprises one or a plurality of polymer blobs or polymer ribs located between said hermetically sealed area of said flexible polymer wall and said gas exchanging membrane.

17. A recipient according to claim 16, wherein said blobs or ribs are provided on said hermetically sealed area of said flexible polymer wall.

18. A recipient according to claim 16, wherein said blobs or ribs are provided on said gas exchanging membrane.

19. A recipient according to claim 16, wherein the blobs or ribs have a thickness in the range of 0.1 mm to 5 mm.

20. A recipient according to claim 16, wherein the spacing arrangement comprises a plurality of polymer blobs, said plurality of blobs being matrix-like arranged in said hermetically sealed area.

21. A recipient according to claim 20, wherein said at least one aperture is provided between said plurality of blobs.

22. A recipient according to claim 20, wherein said sealed area is provided with a plurality of apertures, which plurality of apertures are matrix-like arranged between the plurality of polymer blobs.

23. A recipient according to claim 16, wherein said spacing arrangement comprises a plurality of ribs, said ribs being substantially parallel arranged.

24. A recipient according to claim 11, wherein said spacing arrangement comprises a plurality of bulges provided in said hermetically sealed area of said flexible polymer wall, bulging outwards of the polymer flexible polymer wall towards said gas exchanging membrane.

25. A recipient according to claim 24, wherein said plurality of bulges comprise studs.

26. A recipient according to claim 25, wherein said plurality of bulges are matrix-like arranged in said hermetically sealed area.

27. A recipient according to claim 26, said recipient comprising a plurality of apertures in said hermetically sealed area, said plurality of apertures being matrix-like arranged between said plurality of bulges.

28. A recipient according to claim 24, wherein said at least one aperture is provided between said plurality of bulges.

29. A recipient according to claim 24, wherein said plurality of bulges are line-like bulges.

30. A recipient according to claim 24, wherein the bulges have a thickness in the range of 0.1 mm to 5 mm.

31. A recipient according to claim 11, wherein said spacing arrangement is provided by a raised edge around said aperture, said raised edge being provided at said outer side of said flexible polymer wall in said hermetically sealed area.

32. A recipient according to claim 1, wherein said air chamber provides an average distance between said gas exchanging membrane and said hermetically sealed part of said flexible polymer wall in the range of 0.1 mm to 10 mm.

33. A recipient according to claim 1, wherein said at least one aperture is a substantially circular aperture.

34. A recipient according to claim 1, wherein said at least one aperture has a surface area in the range of 0.18 mm$^2$ to 2.00 mm$^2$.

35. A recipient according to claim 1, wherein said recipient is a bag or container.

36. The use of a recipient according to claim 1 for cultivation of mushroom spawn or fungi.

37. The use of a recipient according to claim 1 for containing powder-like substrate.

38. A recipient for containing a substrate, said recipient comprising a flexible polymer wall having an outer surface and an inner surface for contacting the substrate, at least one gas exchanging membrane, said gas exchanging membrane being coupled to said outer surface of said flexible polymer wall by a hermetical seal along a sealing line, said sealing line defining a hermetically sealed area of said flexible polymer wall, said wall comprising at least one aperture being provided in said hermetically sealed area of said flexible polymer wall, wherein said recipient further comprises a means for creating an air chamber circumscribed by said hermetically sealed area, said hermetical seal and said gas exchanging membrane, for preventing the substrate to contact said gas exchange membrane when said recipient is filled with the substrate thereby bringing the substrate into contact with said hermetically sealed area of said flexible polymer wall at an inner surface of said flexible polymer wall;

wherein said means for creating an air chamber comprises a spacing arrangement located between said gas exchanging membrane and said hermetically sealed area of said flexible polymer wall; and wherein said spacing arrangement comprises one or a plurality of polymer blobs or polymer ribs located between said hermetically sealed area of said flexible polymer wall and said gas exchanging membrane.

39. A recipient for containing a substrate, said recipient comprising a flexible polymer wall having an outer surface and an inner surface for contacting the substrate, at least one gas exchanging membrane, said gas exchanging membrane being coupled to said outer surface of said flexible polymer wall by a hermetical seal along a sealing line, said sealing line defining a hermetically sealed area of said flexible polymer wall, said wall comprising at least one aperture being provided in said hermetically sealed area of said flexible polymer wall, wherein said recipient further comprises a means for creating an air chamber circumscribed by said hermetically sealed area, said hermetical seal and said gas exchanging membrane, for preventing the substrate to contact said gas exchange membrane when said recipient is filled with the substrate thereby bringing the substrate into contact with said hermetically sealed area of said flexible polymer wall at an inner surface of said flexible polymer wall;

wherein said means for creating an air chamber comprises a spacing arrangement located between said gas exchanging membrane and said hermetically sealed area of said flexible polymer wall; and wherein said spacing arrangement comprises a plurality of bulges provided in said hermetically sealed area of said flexible polymer wall, bulging outwards of the polymer flexible polymer wall towards said gas exchanging membrane.

\* \* \* \* \*